United States Patent
Han et al.

(10) Patent No.: US 10,261,474 B2
(45) Date of Patent: Apr. 16, 2019

(54) WATCH TYPE TERMINAL AND OPERATION METHOD THEREOF

(71) Applicant: LG ELECTRONICS INC., Seoul (KR)

(72) Inventors: Soonbo Han, Seoul (KR); Woojun Jung, Seoul (KR); Sangjo Park, Seoul (KR); Hyojin Song, Seoul (KR); Dongyoung Lee, Seoul (KR); Jihye Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 15/514,755

(22) PCT Filed: Oct. 1, 2014

(86) PCT No.: PCT/KR2014/009285
§ 371 (c)(1),
(2) Date: Mar. 27, 2017

(87) PCT Pub. No.: WO2016/047837
PCT Pub. Date: Mar. 31, 2016

(65) Prior Publication Data
US 2017/0220005 A1    Aug. 3, 2017

(30) Foreign Application Priority Data
Sep. 26, 2014   (KR) .................. 10-2014-0129400

(51) Int. Cl.
*H04B 3/36*     (2006.01)
*G04B 47/00*    (2006.01)
(Continued)

(52) U.S. Cl.
CPC ............... *G04B 47/00* (2013.01); *G06F 3/01* (2013.01); *G06F 3/0488* (2013.01); *G06F 3/04842* (2013.01); *H04M 19/047* (2013.01)

(58) Field of Classification Search
CPC .............. G04B 47/00; G08B 13/19613; G08B 13/19615; G08B 21/24; H04M 19/047; G06F 3/01; G06F 3/04842; G06F 3/0488
(Continued)

(56) References Cited

U.S. PATENT DOCUMENTS 6,359,550 B1    3/2002   Brisebois et al.
9,008,730 B2    4/2015   Kim et al.
(Continued)

FOREIGN PATENT DOCUMENTS

EP          0866592 A2      9/1998
KR    20-2009-0002172 U    3/2009
(Continued)

*Primary Examiner* — Anh V La
(74) *Attorney, Agent, or Firm* — Birch, Stewart, Kolasch & Birch, LLP

(57) ABSTRACT

A watch type terminal includes: a haptic module including a plurality of vibration elements and configured to generate a tactile effect that is sensible by a user of the watch type terminal; and a controller configured to acquire event information on the watch type terminal and controls one or more vibration elements among the plurality of vibration elements to operate in a vibration alarm pattern corresponding to the acquired event information. The watch type terminal acquires event information and operates one or more vibration elements among the plurality of vibration elements in a vibration alarm pattern corresponding to the acquired event information.

20 Claims, 48 Drawing Sheets

(51) Int. Cl.
*G06F 3/01* (2006.01)
*G06F 3/0484* (2013.01)
*G06F 3/0488* (2013.01)
*H04M 19/04* (2006.01)

(58) Field of Classification Search
USPC ........ 340/407.1, 311.2, 407.2, 309.16, 309.3
See application file for complete search history.

(56) References Cited

U.S. PATENT DOCUMENTS

| | | |
|---|---|---|
| 2010/0164894 A1 | 7/2010 | Kim et al. |
| 2010/0267424 A1* | 10/2010 | Kim ................... G06F 3/016 455/566 |
| 2014/0180582 A1 | 6/2014 | Pontarelli et al. |
| 2014/0180595 A1* | 6/2014 | Brumback .......... A61B 5/0015 702/19 |
| 2015/0082162 A1* | 3/2015 | Cho ................... G06F 3/016 715/702 |
| 2015/0189056 A1* | 7/2015 | Magi ................... G06F 1/1652 455/566 |
| 2016/0004308 A1* | 1/2016 | Cruz-Hernandez ..... G06F 3/016 345/173 |

FOREIGN PATENT DOCUMENTS

| | | |
|---|---|---|
| KR | 10-2010-0078294 A | 7/2010 |
| KR | 10-2010-0116034 A | 10/2010 |
| KR | 10-2014-0108509 A | 9/2014 |
| KR | 10-1440362 B1 | 9/2014 |

\* cited by examiner

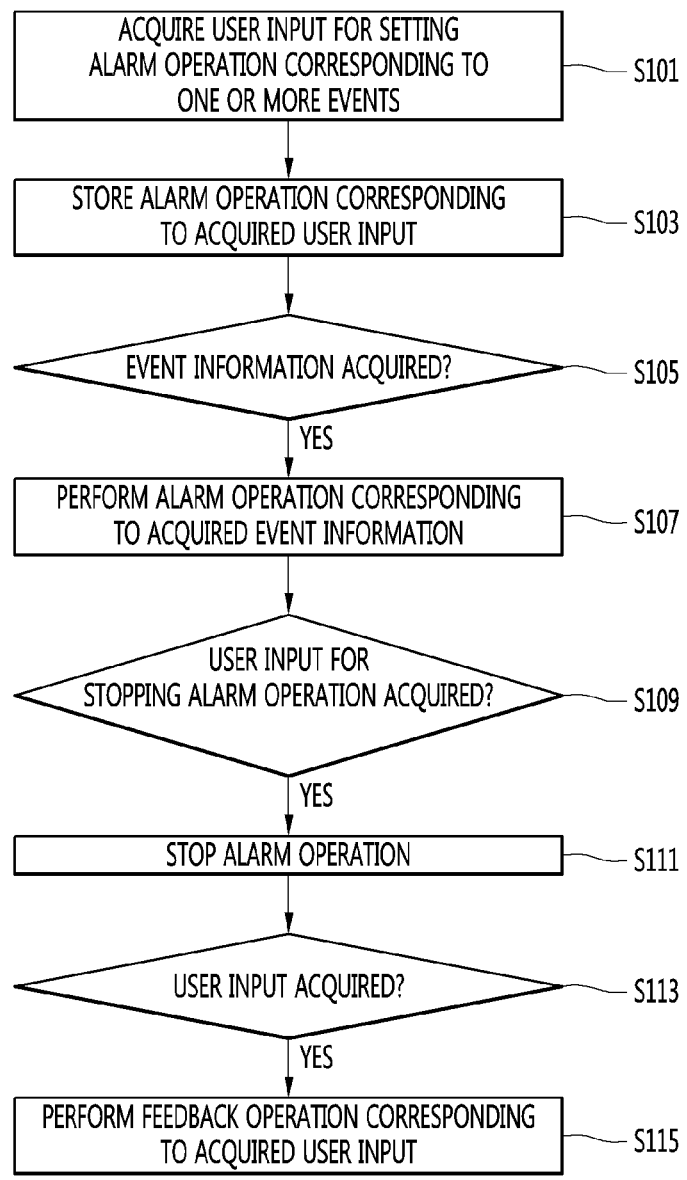

|  | t1 | t2 | t3 | t4 | t5 | t6 |
|---|---|---|---|---|---|---|
| FIRST VIBRATION ELEMENT | | | | | | |
| SECOND VIBRATION ELEMENT | | | | | | |
| THIRD VIBRATION ELEMENT | | | | | | |

FIG. 32

|  | t1 | t2 | t3 | t4 | t5 | t6 |
|---|---|---|---|---|---|---|
| FIRST VIBRATION ELEMENT | ■ |  | ■ |  | ■ |  |
| SECOND VIBRATION ELEMENT | ■ | ■ | ■ | ■ | ■ | ■ |
| THIRD VIBRATION ELEMENT |  | ■ | ■ | ■ | ■ | ■ |

FIG. 33

|  | t1 | t2 | t3 | t4 | t5 | t6 | t7 | t8 |
|---|---|---|---|---|---|---|---|---|
| FIRST VIBRATION ELEMENT | ■ | ■ |  | ■ |  | ■ |  | ■ |
| SECOND VIBRATION ELEMENT | ■ | ■ |  | ■ |  | ■ |  | ■ |
| THIRD VIBRATION ELEMENT | ■ | ■ |  | ■ |  | ■ |  | ■ |

WATCH TYPE TERMINAL AND OPERATION METHOD THEREOF

CROSS REFERENCE TO RELATED APPLICATIONS

This application is the National Phase of PCT International Application No. Ser. PCT/KR2014/009285, filed on Oct. 1, 2014, which claims priority under 35 U.S.C. 119(a) to Patent Application No. 10- 2014- 0129400, filed in the Republic of Korea on Sep. 26, 2014, all of which are hereby expressly incorporated by reference into the present application.

TECHNICAL FIELD

The present disclosure relates to a watch type terminal and an operation method thereof, and more particularly, to a watch type terminal capable of providing a vibration alarm with respect to generated event information.

BACKGROUND ART

Terminals may be generally classified as mobile/portable terminals or stationary terminals according to their mobility. Terminals may also be classified as handheld terminals or vehicle mounted terminals according to whether or not a user can directly carry the terminal.

As such functions become more diversified, the terminal is embodied in the form of a multimedia player that can support complicated functions such as capturing images or video, reproducing music or video files, playing games, receiving broadcast signals, and the like.

Recently, a wearable terminal that is wearable on a human body has been developed. Examples of the wearable terminal include a watch type terminal wearable on a wrist, a glass type terminal wearable on a head like glasses, and the like.

The wearable terminal provides the same performance and functions as those of a general terminal. Accordingly, a user can perform various operations through the wearable terminal and acquire a variety of information. Since the wearable terminal is directly wearable on a user's body, the wearable terminal can collect a variety of data associated with the user.

However, the wearable terminal according to the related art cannot provide various alarms to the user by using the advantage that the wearable terminal is directly wearable on the user's body, and provides an alarm through a simple sound, lighting, or vibration in the same manner as a general terminal.

Therefore, there is a need for a terminal capable of providing an event alarm to a user upon occurrence of an event, and an operation method of the terminal.

DISCLOSURE OF THE INVENTION

Technical Problem

Embodiments of the present disclosure provide an alarm that allows a user to consistently identify an occurrence of an event.

Also, the present disclosure provides a terminal that allows a user to intuitively set an alarm pattern with respect to an event alarm, and an operation method thereof.

Technical Solution

In one embodiment, an operation method of a watch type terminal including a plurality of vibration elements includes: acquiring event information; and operating one or more vibration elements among the plurality of vibration elements in a vibration alarm pattern corresponding to the acquired event information.

In another embodiment, a watch type terminal includes: a haptic module including a plurality of vibration elements and configured to generate a tactile effect that is sensible by a user of the watch type terminal; and a controller configured to acquire event information on the watch type terminal and control one or more vibration elements among the plurality of vibration elements to operate in a vibration alarm pattern corresponding to the acquired event information.

Advantageous Effects

In a terminal and an operation method thereof in accordance with embodiments of the present disclosure, since a user can receive alarms respectively corresponding to various events, the user can distinguish the generated events by just alarm recognition.

Furthermore, in accordance with the present disclosure, since a watch type terminal is wearable on a user's body at a constant position and in a constant direction, a user can recognize a vibration alarm easily and consistently.

Moreover, in accordance with the present disclosure, since an intuitive interface for setting an alarm pattern can be provided, a user can easily set a desired alarm pattern.

BRIEF DESCRIPTION OF THE DRAWINGS

FIG. 17 is a flowchart of an operation method of a watch type terminal in accordance with an embodiment of the present disclosure.

FIG. 32 is an exemplary view illustrating vibrating operation patterns in accordance with another embodiment of the present disclosure.

FIG. 33 is an exemplary view illustrating vibrating operation patterns in accordance with further another embodiment of the present disclosure.

MODE FOR CARRYING OUT THE INVENTION

Figure 1:
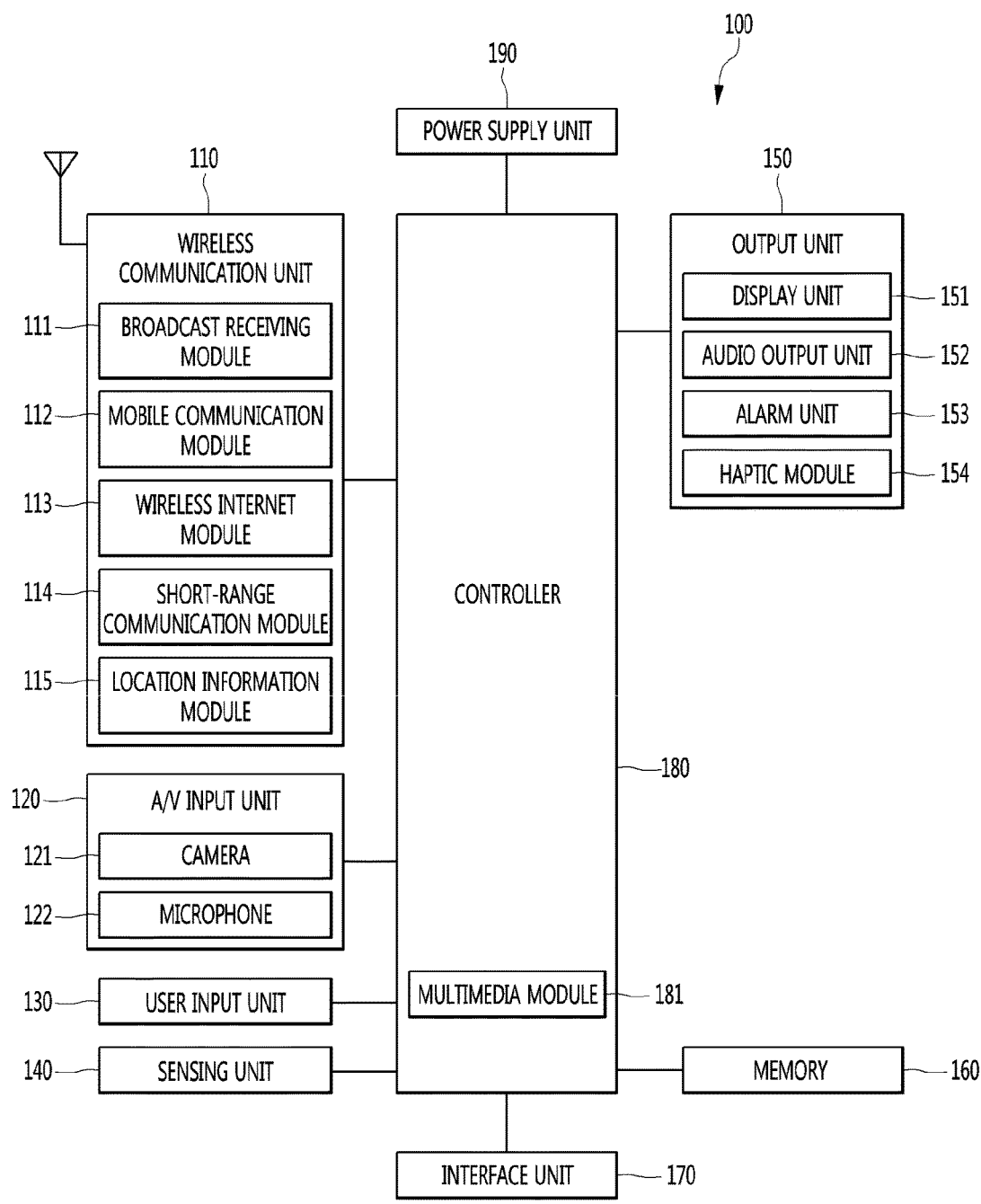
FIG. 1 is a block diagram of a terminal in accordance with an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of terminals. However, such teachings apply equally to other types of terminals, such as those types noted above. In addition, these teachings may also be applied to stationary terminals such as digital TV, desktop computers, and the like.

Next, a configuration of a terminal in accordance with an embodiment of the present disclosure will be described with reference to FIG. 1.

FIG. 1 is a block diagram of a terminal in accordance with an embodiment of the present disclosure.

The terminal 100 may include a wireless communication unit 110, an audio/video (A/V) input unit 120, a user input unit 130, a sensing unit 140, an output unit 150, a memory 160, an interface unit 170, a controller 180, and a power supply unit 190. It is understood that implementing all of the illustrated components is not a requirement, and that greater or fewer components may alternatively be implemented.

Hereinafter, the components will be described in sequence.

The wireless communication unit 110 typically includes one or more components which permit wireless communication between the terminal 100 and a wireless communication system or network within which the terminal is located. The wireless communication unit 110 includes one or more of a broadcast receiving module 111, a mobile communication module 112, a wireless Internet module 113, a short-range communication module 114, and a location information module 115.

The broadcast receiving module 111 is typically configured to receive a broadcast signal and/or broadcast associated information from an external broadcast management server via a broadcast channel.

The broadcast channel may include a satellite channel and a terrestrial channel. The broadcast management server may mean a server which generates and transmits a broadcast signal and/or broadcast associated information, or a server which receives a pre-generated broadcast signal and/or broadcast associated information and sends such items to the terminal. The broadcast signal may include a TV broadcast signal, a radio broadcast signal, and a data broadcast signal and may also include a data broadcast signal combined with a TV broadcast signal or a radio broadcast signal.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like.

The broadcast receiving module 111 may receive digital broadcast signals by using a digital broadcast system, such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). The broadcast receiving module 111 may also be configured to be suitable for other broadcast systems as well as the above-described digital broadcast system.

Broadcast signals and/or broadcast associated information received through the broadcast receiving module 111 may be stored in the memory 160.

The mobile communication module 112 transmits and receives wireless signals to and from at least one of a base station, an external terminal, and a server via a mobile communication network. Examples of the wireless signals may include voice call signals, video call signals, or various formats of data to support transmission and reception of text and multimedia messages.

The wireless Internet module 113 is configured to facilitate wireless Internet access. This module may be internally or externally coupled to the terminal 100. Examples of such wireless Internet access include Wireless LAN (WLAN), Wireless Fidelity (Wi-Fi), Wireless Broadband (WiBro), Worldwide Interoperability for Microwave Access (Wi-MAX), High Speed Downlink Packet Access (HSDPA), and the like.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), and the like. The location information module 115 is generally configured to detect, calculate, derive or otherwise identify a position of the terminal. As one example, the location information module 115 includes a Global Position System (GPS) module, a Wi-Fi module, or both. If desired, the location information module 115 may alternatively or additionally function with any of the other modules of the wireless communication unit 110 to obtain data related to the position of the terminal.

As one example, when the terminal uses a GPS module, a position of the terminal may be acquired using a signal sent from a GPS satellite. As another example, when the terminal uses the Wi-Fi module, a position of the terminal can be acquired based on information related to a wireless access point (AP) which transmits or receives a wireless signal to or from the Wi-Fi module.

Referring to FIG. 1, the A/V input unit 120 may be configured to input audio signals or video signals and may include a camera 121 and a microphone 122. The camera 121 processes image frames of still pictures or video obtained by image sensors in a video call mode or an image capture mode. The processed image frames may be displayed on the display unit 151.

The image frames processed by the camera 121 may be stored in the memory 160, or may be transmitted to the outside through the wireless communication unit 110. The camera 121 may include two or more cameras according to a use environment.

The microphone 122 receives external audio signals in a call mode, a record mode, a voice recognition mode, or the like and processes the received external sound signals into electrical audio data. In the call mode, the processed audio data may be converted into a format transmittable to a mobile communication base station through the mobile communication module 112 and be then outputted. The microphone 122 may use various noise removal algorithms for removing noise generated in the course of receiving the external audio signals.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the terminal, the surrounding environment of the terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The terminal 100 may be configured to utilize information obtained from sensing unit 140, and in particular, information obtained from one or more sensors of the sensing unit 140, and combinations thereof. The output unit 150 is typically configured to output various types of information, such as audio, video, tactile output, and the like. The output unit 150 is shown having a display unit 151, an audio output module 152, an alarm unit 153, and a haptic module 154.

The display unit 151 may have an inter-layered structure or an integrated structure with a touch sensor in order to facilitate a touch screen. The touch screen may provide an output interface between the terminal 100 and a user, as well as function as the user input unit 123 which provides an input interface between the terminal 100 and the user.

The display unit 151 displays (outputs) information processed by the terminal 100. For example, in the call mode, the terminal displays a user interface (UI) or a graphic user interface (GUI) associated with a call. In the video call mode or the image capture mode, the terminal 100 displays a captured and/or received image, a UI, or a GUI.

The display unit 151 include a liquid crystal display (LCD), a thin film transistor-liquid crystal display (TFT-LCD), an organic light emitting diode (OLED), a flexible display, a 3-dimensional (3D) display, an e-ink display, and combinations thereof.

Some of those displays may be configured in a transparent type or transmissive type so that the user can view the outside therethrough. This may be called a transparent display, and a representative example of the transparent display is a Transparent OLED (TOLED). A rear structure of the display unit 151 may also be configured in a transmissive structure. Due to such a structure, the user can view an object located in the rear of a terminal body through a region of the terminal body occupied by the display unit 151.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

In a case where the display unit 151 and a sensor (hereinafter, referred to as a "touch sensor") 144 sensing a touch action form a mutual layer structure (hereinafter, referred to as a "touch screen"), the display unit 151 may also be used as an input device as well as the output device. The touch sensor 144 may have the form of, for example, a touch film, a touch sheet, or a touch pad.

The touch sensor 144 may be configured such that a pressure applied to a specific portion of the display unit 151 or a change in a capacitance generated in the specific portion of the display unit 151 is converted into an electrical input signal. The touch sensor 144 may be configured to detect a touch pressure and a touch capacitance as well as a touch position and a touch area.

When a touch input is sensed by a touch sensor 144, corresponding signals may be transmitted to a touch controller. The touch controller may process the received signals, and then transmit corresponding data to the controller 180. Accordingly, the controller 180 may sense which region of the display unit 151 has been touched.

Also, the controller 180 may determine a type of a user touch input based on the touch area, the touch pressure, and the touch capacitance. Accordingly, the controller 180 may distinguish a user's finger touch, a user's nail touch, a user's knuckle touch, and a multi-touch using a plurality of fingers.

Referring to FIG. 1, the proximity sensor 141 may be arranged in an inner region of the terminal covered by the touch screen, or near the touch screen. The proximity sensor 141 refers to a sensor which senses the presence or absence of an object approaching a certain detection surface or an object existing near the proximity sensor 141 by using an electromagnetic force or infrared rays, without any mechanical contact. The proximity sensor 141 has a longer lifespan and higher utilization than a contact sensor.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

Information corresponding to the detected proximity touch operation and the proximity touch pattern may be displayed on the touch screen.

The audio output module 152 is typically configured to output audio data. Such audio data may be obtained from any of a number of different sources, such that the audio data may be received from the wireless communication unit 110 or may have been stored in the memory 160. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the terminal 100. The audio output module 152 may also be implemented as a receiver, a speaker, a buzzer, or the like.

The alarm unit 153 may output signals for notifying events occurring in the terminal 100. Examples of the events occurring in the terminal 100 include a call signal reception, a message reception, a key signal input, and a touch input. The alarm unit 153 may output signals for notifying event occurrence by using methods other than video signals or audio signals, for example, by way of vibration. The video signals or audio signals may be output through the display unit 151 or the audio output module 152. Therefore, the display unit 151 and the audio output module 152 may be classified as a part of the alarm unit 153.

A haptic module 154 can be configured to generate various tactile effects that a user feels, perceives, or otherwise experiences. A typical example of the tactile effects generated by the haptic module 154 is vibration. The strength, pattern and the like of the vibration generated by the haptic module 154 can be controlled by user selection or setting by the controller. For example, the haptic module 154 may output different vibrations in a combining manner or a sequential manner.

Besides vibration, the haptic module 154 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 154 can also be implemented to allow the user to feel a tactile effect through a muscle sensation such as the user's fingers or arm, as well as transferring the tactile effect through direct contact. Two or more haptic modules 154 may be provided according to the particular configuration of the terminal 100.

Also, the haptic module 154 may include a vibration element which can generate vibration. For example, the haptic module 154 may include one or more vibration motors. Examples of the vibration motors may include a bar type vibration motor, a coin type vibration motor, and the like.

The haptic module 154 may be arranged at various positions according to the type of the terminal 100. For example, in the case of the watch type terminal 300, the haptic module 154 may be included in one or more of a main body 301 and a band 302 of the watch type terminal 300.

The memory 160 is typically implemented to store data to support various functions or features of the terminal 100. For instance, the memory 160 may be configured to store application programs executed in the terminal 100, data or instructions for operations of the terminal 100, and the like. Some of these application programs may be downloaded from an external server via wireless communication. Other application programs may be installed within the terminal 100 at time of manufacturing or shipping, which is typically the case for basic functions of the terminal 100 (for example, receiving a call, placing a call, receiving a message, sending a message, and the like). It is common for application programs to be stored in the memory 160, installed in the terminal 100, and executed by the controller 180 to perform an operation (or function) for the terminal 100.

The memory 160 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The terminal 100 may also be operated in relation to a network storage device that performs the storage function of the memory 160 over a network, such as the Internet.

The interface unit 170 serves as an interface with any home devices connected to the terminal 100. The interface unit 170 may receive data from the external device, may receive power and transmit the power to each component of the terminal 100, or may transmit internal data of the terminal 100 to the external device. For example, the interface unit 170 may include a wired/wireless headset port, an external charger port, a wired/wireless data port, a memory card port, a port for connecting a device equipped with an identification module, an audio I/O port, a video I/O port, and an earphone port.

The identification module may be a chip that stores a variety of information for authenticating authority of using the terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via a port.

When the terminal 100 is connected with an external cradle, the interface unit 170 can serve as a passage to allow power from the cradle to be supplied to the terminal 100 or may serve as a passage to allow various command signals input by the user from the cradle to be transferred to the terminal there through. Various command signals or power input from the cradle may operate as signals for recognizing that the terminal is properly mounted on the cradle. The controller 180 controls an overall operation of the terminal 100. For example, the controller 180 performs control and processing related to a voice call, data communication, video call, and the like. The controller 180 may include a multimedia module 181 for multimedia reproduction. The multimedia module 181 may be implemented within the controller 180, or may be implemented separately from the controller 180.

The controller 180 can perform pattern recognition processing to recognize a handwriting input or a picture drawing input performed on the touch screen as characters or images, respectively.

The power supply unit 190 receives external power or provides internal power and supplies the appropriate power required for operating respective elements and components included in the terminal 100. Various embodiments described herein may be implemented in a computer-readable medium, a machine-readable medium, or similar medium using, for example, software, hardware, or any combination thereof.

According to hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, these embodiments may be implemented by the controller 180.

According to software implementation, embodiments such as procedures or functions may be implemented together with separate software modules which perform at least one function or operation. Software codes may be implemented by a software application written in an appropriate program language. The software codes may be stored in the memory 160 and executed by the controller 180.

The above-described terminal 100 may be a portable terminal or a stationary terminal. Accordingly, the terminal 100 may be directly carried by the user, or may be stationary in a certain region.

In accordance with still further embodiments, a terminal may be configured as a device which is wearable on a human body. Such devices go beyond the usual technique of a user grasping the terminal using their hand. Examples of the wearable device include a smart watch, a smart glass, a head mounted display (HMD), and the like.

Figure 2:
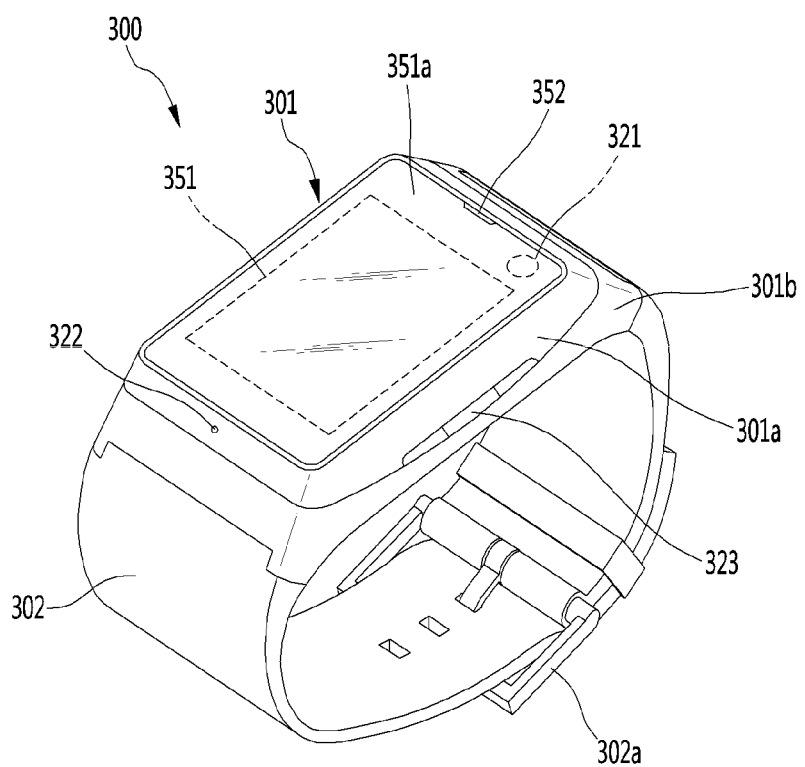
FIG. 2 is a perspective view illustrating one example of a watch type terminal in accordance with another embodiment of the present disclosure.

A typical wearable device can exchange data with (or cooperate with) another terminal 100. In such a device, the wearable device generally has functionality that is less than the cooperating terminal. For instance, the short-range communication module 114 of a terminal 100 may sense or recognize a wearable device that is near-enough to communicate with the terminal. In addition, when the sensed wearable device is a device which is authenticated to communicate with the terminal 100, the controller 180 may transmit data processed in the terminal 100 to the wearable device via the short-range communication module 114, for example. Hence, a user of the wearable device can use the data processed in the terminal 100 on the wearable device. For example, when a call is received in the terminal 100, the user can answer the call using the wearable device. Also, when a message is received in the terminal 100, the user can check the received message using the wearable device. FIG. 2 is a perspective view illustrating one example of a watch type terminal 300 in accordance with another exemplary embodiment. As illustrated in FIG. 2, the watch type terminal 300 includes a main body 301 with a display unit 351 and a band 302 connected to the main body 301 to be wearable on a wrist. Generally, the terminal 300 may have the same features as those of the terminal 100, or may have similar features to those of the terminal 100. Therefore, the watch type terminal 300 may include the elements included in the above-described terminal 100.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a terminal 300 with a uni-body.

The watch type terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown as being located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a. The illustrated embodiment includes an audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band 302 may include therein a ground extending portion (not shown) electrically connected to the antenna to extend a ground area.

The band 302 may include a fastener 302a. The fastener 302a may be implemented by a buckle, a snap-fittable hook structure, or a Velcro (registered trademark) and may include a flexible section or material. FIG. 2 illustrates an example in which the fastener 302a is implemented in a buckle type.

The controller 380 controls an overall operation of the watch type terminal 300 and may perform an event alarm operation through one or more of the display unit 351, the audio output module 352, and the haptic module 354.

Also, the controller 380 may recognize whether a wearing position of the watch type terminal 300 is a left wrist of the user or a right wrist of the user. For example, the controller 380 may recognize the wearing position of the watch type terminal 300 based on one or more of a user's motion, a user's physical condition, a user's body form contacting the watch type terminal 300, and body information. notification position of the watch type terminal 300 based on information on a blood vessel of the user contacting one or more of the main body 301 and the band 302.

In addition, the watch type terminal 300 may include the haptic module 354 having the same configuration as the above-described haptic module 154. The haptic module 354 generates various tactile effects that a user can feel. A typical example of the tactile effect generated by the haptic module 354 is vibration. The strength, pattern, and the like of the vibration generated by the haptic module 354 are controllable. For example, the haptic module 354 may output different vibrations in a combining manner or a sequential manner. The haptic module 354 may include a plurality of vibration elements and may control one or more of an operation pattern, a vibration strength, and a vibration time of each of the vibration elements. This will be described below.

Besides vibration, the haptic module 354 can generate various other tactile effects, including an effect by stimulation such as a pin arrangement vertically moving to contact skin, a spray force or suction force of air through a jet orifice or a suction opening, a touch to the skin, a contact of an electrode, or electrostatic force, an effect by reproducing the sense of cold and warmth using an element that can absorb or generate heat, and the like.

The haptic module 354 can also be implemented to allow the user to feel a tactile effect through a muscle sensation such as the user's fingers or arm, as well as transferring the tactile effect through direct contact. Two or more haptic modules 354 may be provided according to the particular configuration of the watch type terminal 300. For example, the plurality of haptic modules 354 may be provided in the main body 301 and the band 302 of the watch type terminal 300.

Also, the haptic module 354 may include a vibration element 600 which can generate a vibration. For example, the haptic module 354 may include one or more vibration elements 600. Examples of the vibration elements may include a bar type vibration element, a coin type vibration element, and the like.

This will be described below with reference to FIG. 3.

Figure 3:
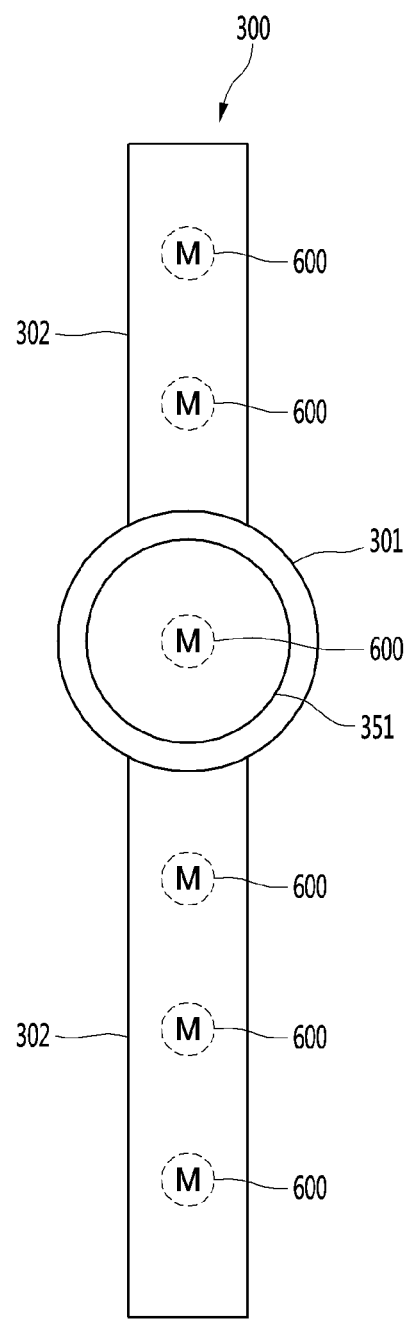
FIG. 3 is an exemplary view illustrating arrangement of vibration elements in accordance with an embodiment of the present disclosure.

FIG. 3 is an exemplary view illustrating arrangement of vibration elements in accordance with an embodiment of the present disclosure.

Referring to FIG. 3, the plurality of vibration elements 600 may be provided in the main body 301 and the band 302 of the watch type terminal 300. The plurality of vibration elements 600 may be provided in the watch type terminal 300 at regular intervals or regular distances.

Also, a plurality of vibration elements 600 may be provided in the watch type terminal 300 at each regular interval or regular distance.

This will be described below with reference to FIG. 4.

Figure 4:
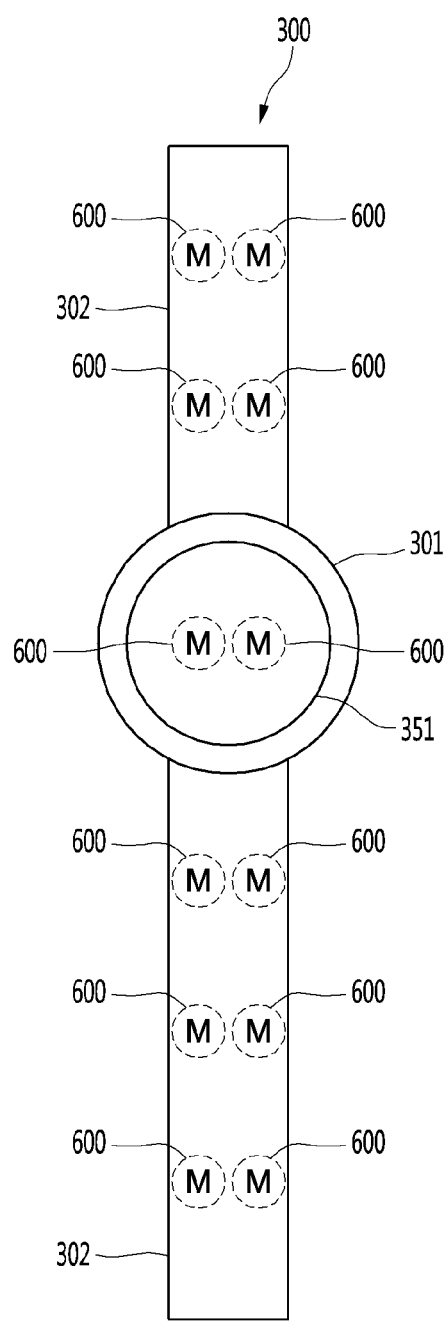
FIG. 4 is an exemplary view illustrating arrangement of vibration elements in accordance with another embodiment of the present disclosure.

FIG. 4 is an exemplary view illustrating arrangement of vibration elements according to another embodiment of the present disclosure.

Referring to FIG. 4, the plurality of vibration elements 600 may be provided in the main body 301 and the band 302 of the watch type terminal 300. The plurality of vibration elements 600 may be disposed at one position. Accordingly, the plurality of vibration elements 600 may be provided in the watch type terminal 300 at each regular interval or regular distance.

On the other hand, the vibration elements 600 may be provided at only one or more of the main body 301 and the band 302 and may be provided at each regular interval or regular distance. Accordingly, when the user wears the watch type terminal 300 on the user's wrist, the plurality of vibration elements 600 may maintain the regular intervals or regular distances.

On the other hand, the plurality of vibration elements 600 may respectively correspond to a plurality of regions displayed on the display unit 351. Accordingly, when the user touches one of the regions displayed on the display unit 351, the watch type terminal 300 may vibrate the vibration element 600 corresponding to the touched region.

This will be described below with reference to FIGS. 5 and 6.

Figure 5:
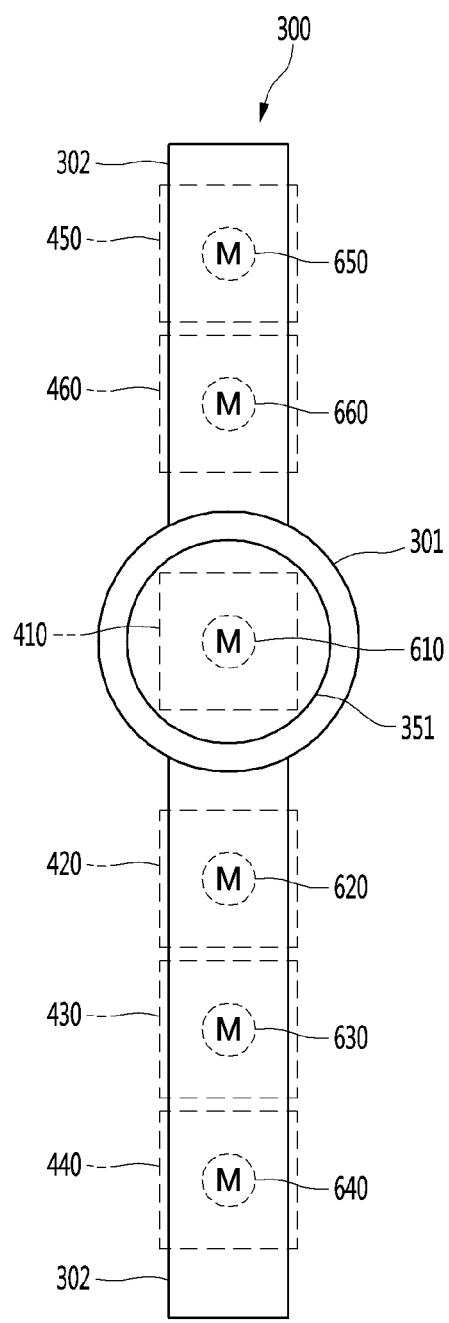
FIG. 5 is an exemplary view illustrating a plurality of vibration elements corresponding to a plurality of regions in accordance with an embodiment of the present disclosure.

FIG. 5 is an exemplary view illustrating a plurality of vibration elements corresponding to a plurality of regions in accordance with an embodiment of the present disclosure.

Figure 6:
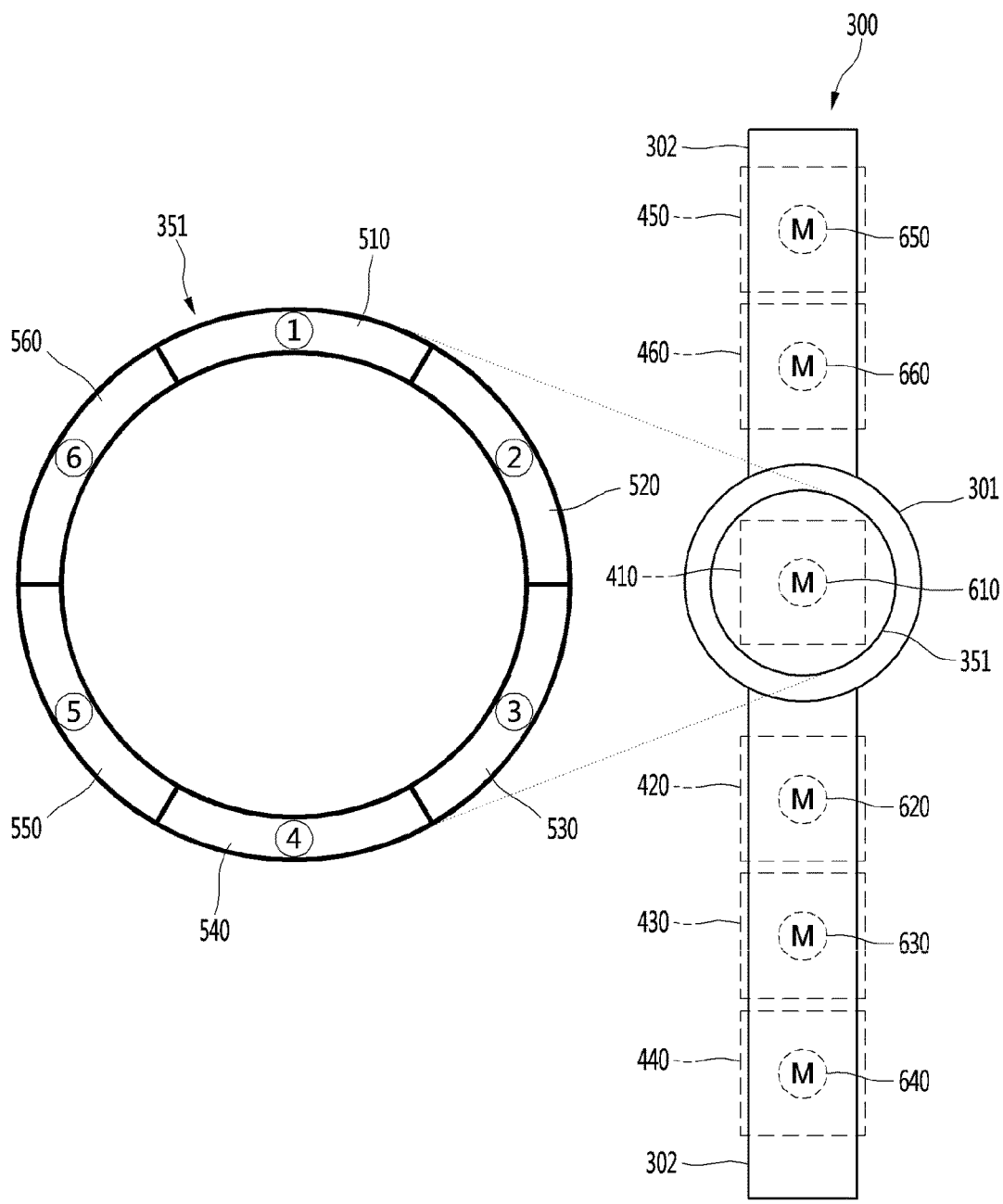
FIG. 6 illustrates a plurality of vibration regions corresponding to a plurality of regions displayed on a display unit in accordance with an embodiment of the present disclosure.

FIG. 6 illustrates a plurality of vibration regions corresponding to a plurality of regions displayed on a display unit in accordance with an embodiment of the present disclosure.

Referring to FIG. 5, the main body 301 and the band 302 of the watch type terminal 300 may include a plurality of vibration elements 610, 620, 630, 640, 650, and 660 arranged at regular intervals. The plurality of vibration elements 610, 620, 630, 640, 650, and 660 may respectively correspond to the plurality of vibration regions 410, 420, 430, 440, 450, and 460. Accordingly, the first vibration element 610 may correspond to the first vibration region 410, and the second vibration element 620 may correspond to the second vibration region 420. The third vibration element 630 may correspond to the third vibration region 430, and the fourth vibration element 640 may correspond to the fourth vibration region 440. The fifth vibration element 650 may correspond to the fifth vibration region 450, and the sixth vibration element 660 may correspond to the sixth vibration region 460.

Referring to FIG. 6, the controller 380 of the watch type terminal 300 may display a plurality of regions 510, 520, 530, 540, 550, and 560 on the display unit 351. The plurality of displayed regions 510, 520, 530, 540, 550, and 560 may respectively correspond to a plurality of vibration regions 410, 420, 430, 440, 450, and 460.

Accordingly, when the controller 380 acquires a user input for one of the plurality of regions 510, 520, 530, 540, 550, and 560, the controller 380 may perform control such that the vibration element included in the vibration region corresponding to the acquired user input performs a vibrating operation. For example, when the controller 380 acquires a user input of touching one of the plurality of regions 510, 520, 530, 540, 550, and 560, the controller 380 may perform control such that the vibration element included in the vibration region corresponding to the touched region performs a vibrating operation.

This will be described below with reference to FIGS. 7 to 9.

Figure 7:
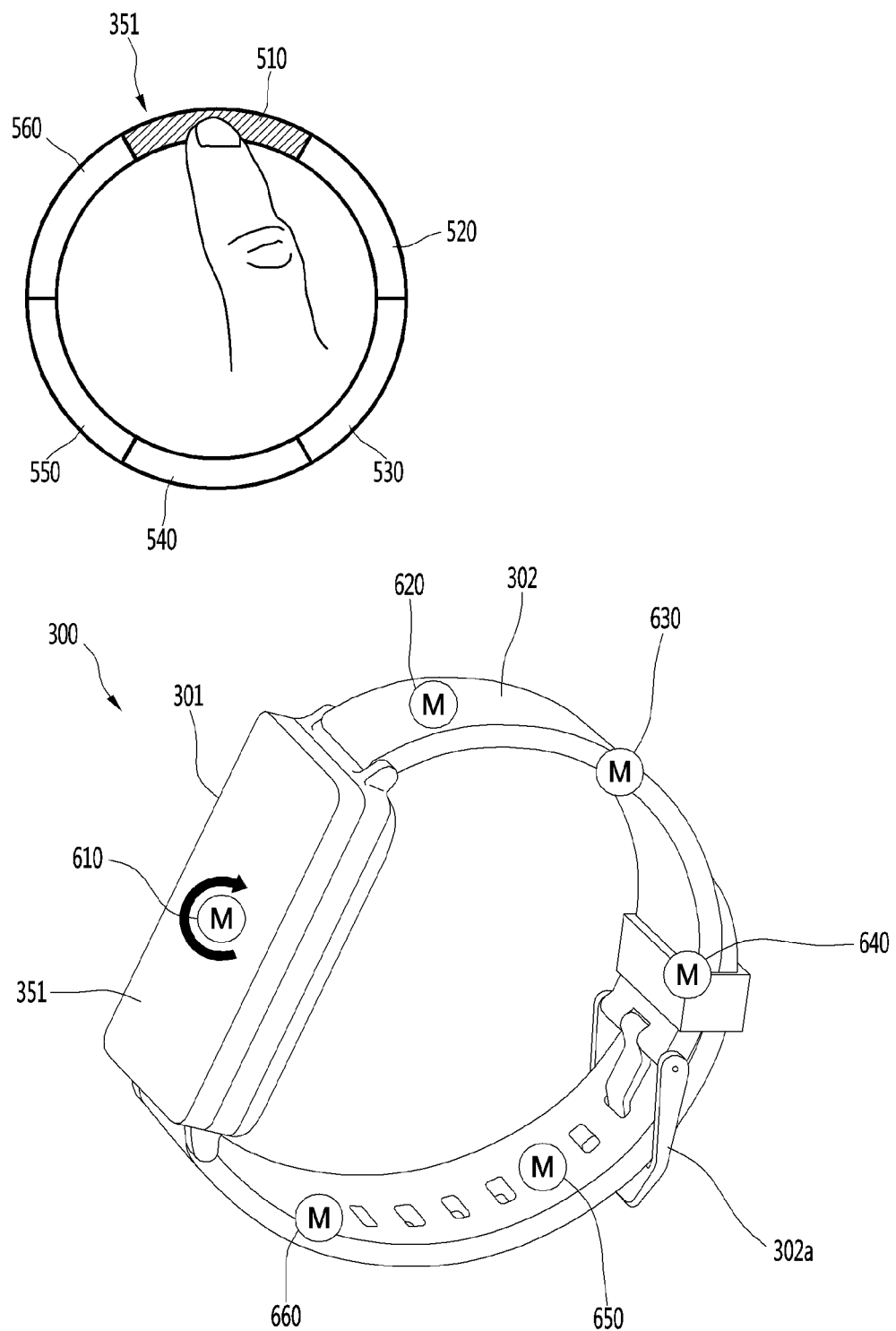
FIGS. 7 to 9 are exemplary views illustrating vibrating operations with respect to touch inputs in accordance with an embodiment of the present disclosure.
Figure 8:
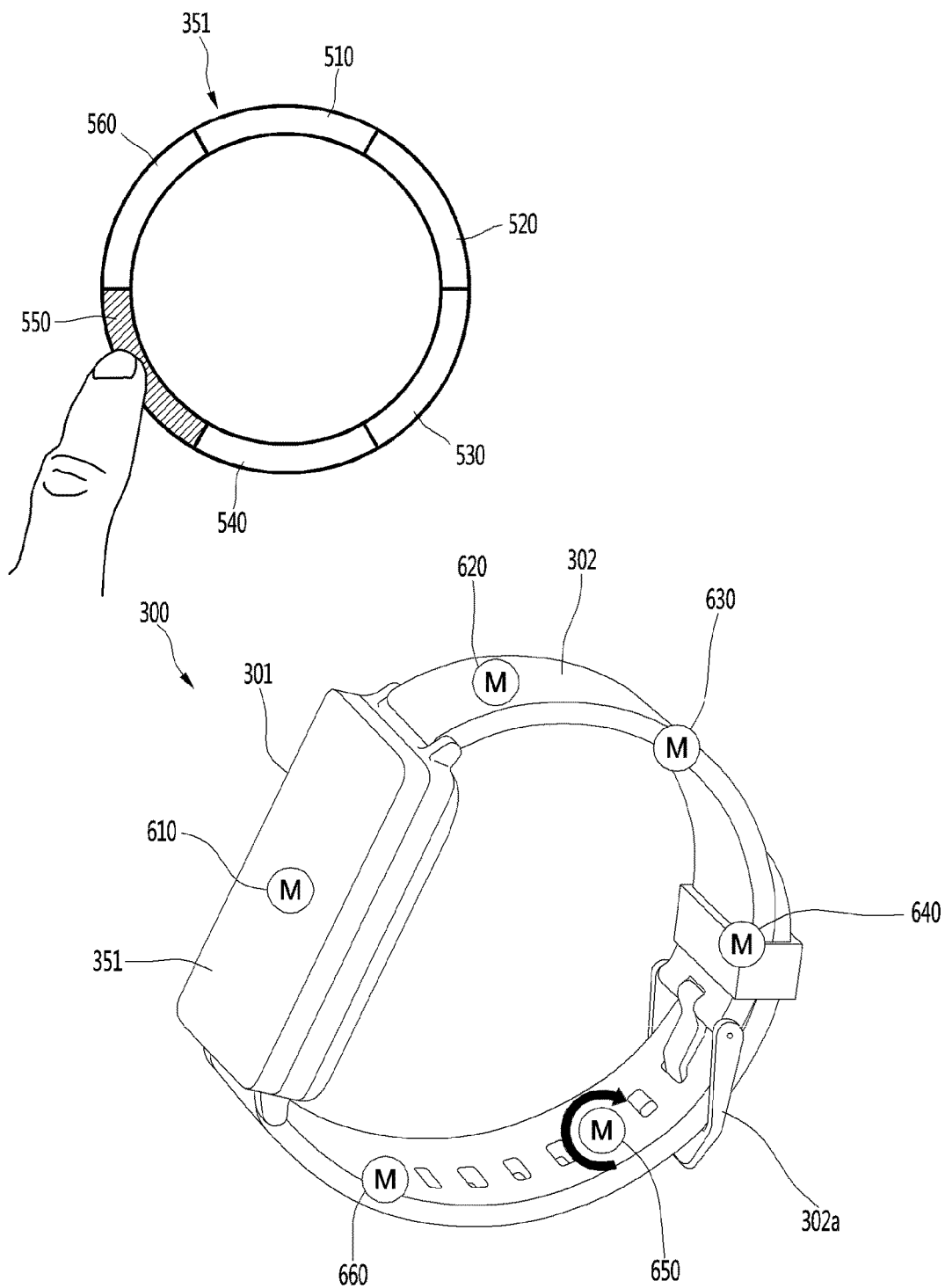
Figure 9:
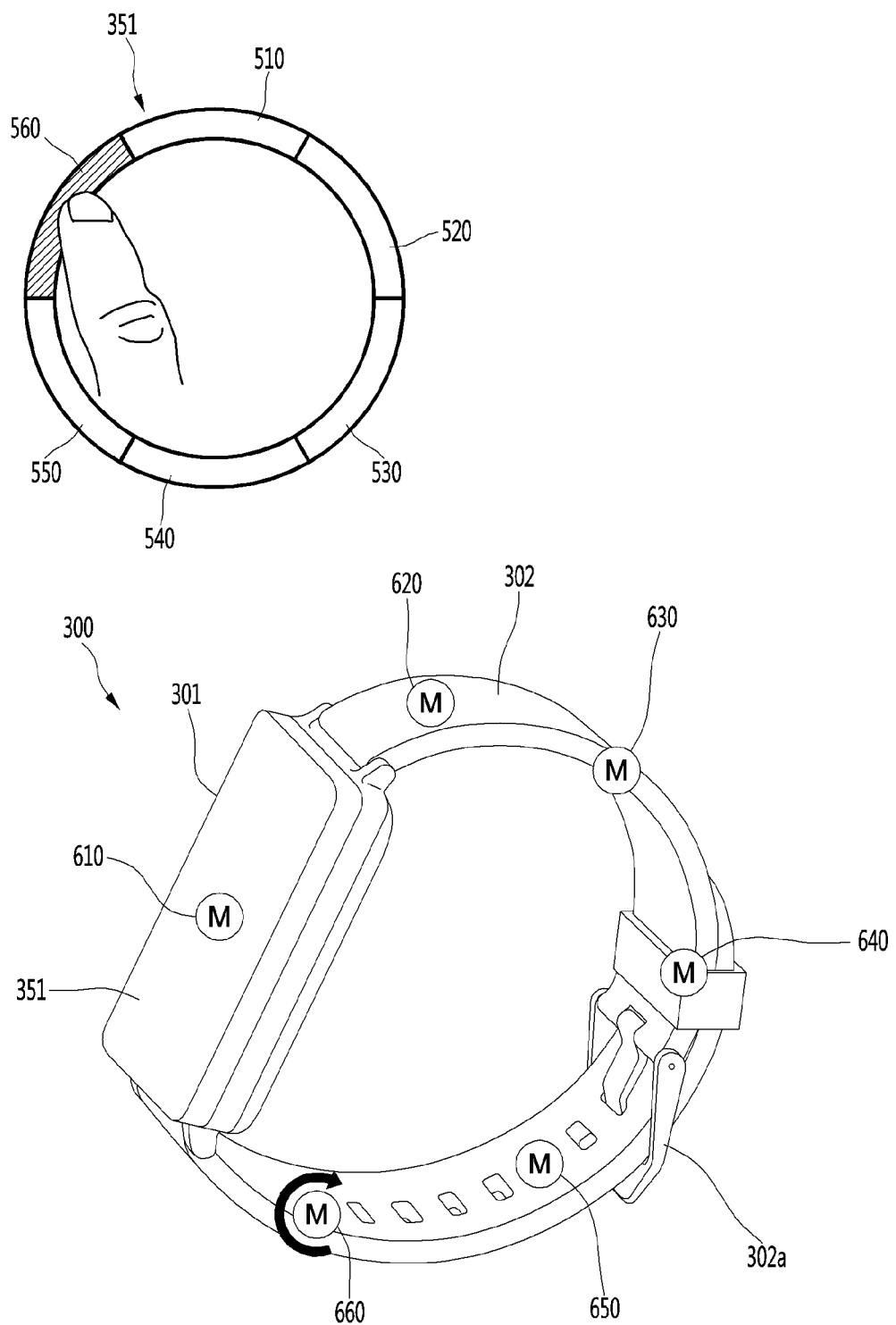

FIGS. 7 to 9 are exemplary views for describing vibrating operations with respect to touch inputs in accordance with an embodiment of the present disclosure.

According to an embodiment, referring to FIG. 7, when the controller 380 acquires a user input of touching the first region 510 among the plurality of regions 510, 520, 530, 540, 550, and 560 displayed on the display unit 351, the controller 380 may perform control such that the first vibration element 610 corresponding to the first region 510 performs a vibrating operation. Here, the first vibration element 610 may correspond to the first vibration region 410.

According to another embodiment, referring to FIG. 8, when the controller 380 acquires a user input of touching the fifth region 550 among the plurality of regions 510, 520, 530, 540, 550, and 560 displayed on the display unit 351, the controller 380 may perform control such that the fifth vibration element 650 corresponding to the fifth region 550 performs a vibrating operation. Here, the fifth vibration element 650 may correspond to the fifth vibration region 450.

According to further another embodiment, referring to FIG. 9, when the controller 380 acquires a user input of touching the sixth region 560 among the plurality of regions 510, 520, 530, 540, 550, and 560 displayed on the display unit 351, the controller 380 may perform control such that the sixth vibration element 660 corresponding to the sixth region 560 performs a vibrating operation. Here, the sixth vibration element 660 may correspond to the sixth vibration region 460.

As such, when the controller 380 acquires a user input of touching one of the plurality of displayed regions, the controller 380 may perform control such that the vibration element corresponding to the touched region performs a vibrating operation. When the controller 380 performs control such that the vibration element performs the vibrating operation, the region corresponding to the vibration element performing the vibrating operation among the plurality of regions displayed on the display unit 351 may be displayed distinguishably from the other regions.

The descriptions about the vibrating operations of the plurality of vibration elements corresponding to the plurality of displayed regions are only for illustrative purposes, and the present disclosure is not limited thereto. Various settings can be made according to a user or designer selection. Therefore, the plurality of vibration elements, the plurality of regions, and the plurality of vibration regions may be set with various numbers.

Also, the watch type terminal 300 in accordance with the present disclosure may include a plurality of regions provided in the main body 301 and capable of acquiring a user input. The controller 380 may acquire a user input for the plurality of regions provided in the main body 301 and perform control such that the vibration element corresponding to the region acquired among the plurality of regions performs a vibrating operation. For example, when the plurality of regions capable of acquiring the user input are provided at a periphery of the watch type terminal 300, the controller 380 may acquire the user input equally to the plurality of regions displayed on the display unit 351 and perform control such that the vibration element corresponding to the acquired user input performs a vibrating operation. The plurality of regions provided in the main body 301 may be a touch pad with a touch sensor, or may be provided in the form of buttons, keys, or the like. The plurality of regions provided in the main body 301 may be included in the user input unit 323. Hereinafter, for easy description, the watch type terminal 300 in accordance with the present disclosure will be described based on the plurality of regions displayed on the display unit 351, but the plurality of regions may be provided in the main body 301 as described above.

On the other hand, the vibration element 600 may be rotated in a direction perpendicular or parallel to a length direction of the main body 301 or the band 302.

This will be described below with reference to FIGS. 10 to 12.

Figure 10:
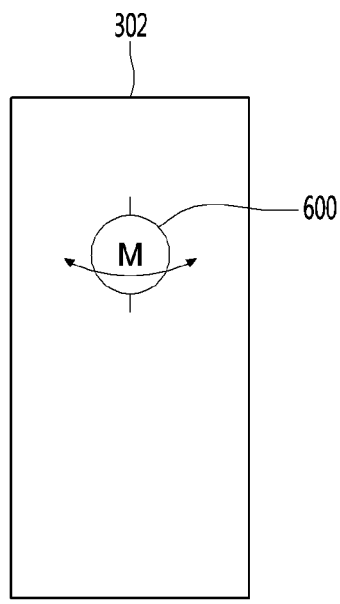
FIG. 10 is an exemplary view illustrating rotation of a vibration element in accordance with an embodiment of the present disclosure.

FIG. 10 is an exemplary view illustrating rotation of a vibration element in accordance with an embodiment of the present disclosure.

Figure 11:
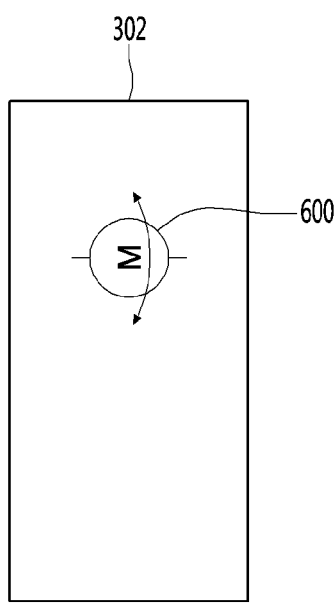
FIG. 11 is an exemplary view illustrating rotation of a vibration element in accordance with another embodiment of the present disclosure.

FIG. 11 is an exemplary view illustrating rotation of a vibration element in accordance with another embodiment of the present disclosure.

Figure 12:
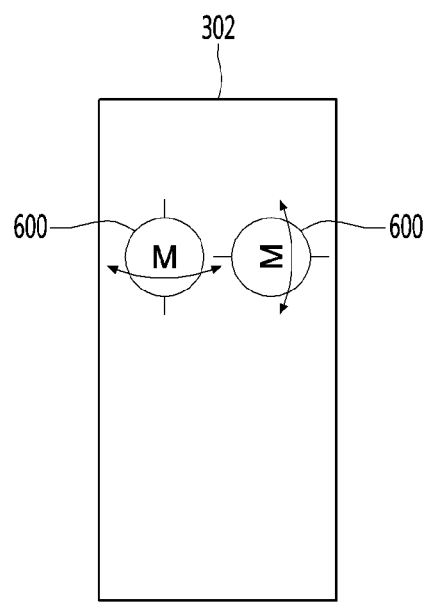
FIG. 12 is an exemplary view illustrating rotation of vibration elements in accordance with further another embodiment of the present disclosure.

FIG. 12 is an exemplary view illustrating rotation of vibration elements in accordance with further another embodiment of the present disclosure.

Referring to FIG. 10, the vibration element 600 may be provided in the band 302, and a rotational shaft of the vibration element 600 may be disposed in a direction parallel to the band 302. Accordingly, the vibration element 600 may be rotated in a direction perpendicular to a length direction of the band 302. Also, as described above, the vibration element 600 may be provided in the main body 301 and rotated in a direction perpendicular to a length direction of the main body 301.

Referring to FIG. 11, the vibration element 600 may be provided in the band 302, and a rotational shaft of the vibration element 600 may be disposed in a direction perpendicular to the band 302. Accordingly, the vibration element 600 may be rotated in a direction parallel to a length direction of the band 302. Also, as described above, the vibration element 600 may be provided in the main body 301 and rotated in a direction parallel to a length direction of the main body 301.

Referring to FIG. 12, a plurality of vibration elements 600 may be provided in the band 302, and rotational shafts of the plurality of vibration elements 600 may be disposed in a direction perpendicular to the band 302 or parallel to the band 302. Accordingly, the plurality of vibration elements 600 may be rotated in a direction parallel to a length direction of the band 302 or perpendicular to a length direction of the band 302. Also, as described above, the plurality of vibration elements 600 may be provided in the main body 301 and rotated in a direction parallel or perpendicular to a length direction of the main body 301.

On the other hand, the vibration element 600 may rotate the rotational shaft thereof.

This will be described below with reference to FIG. 13.

Figure 13:
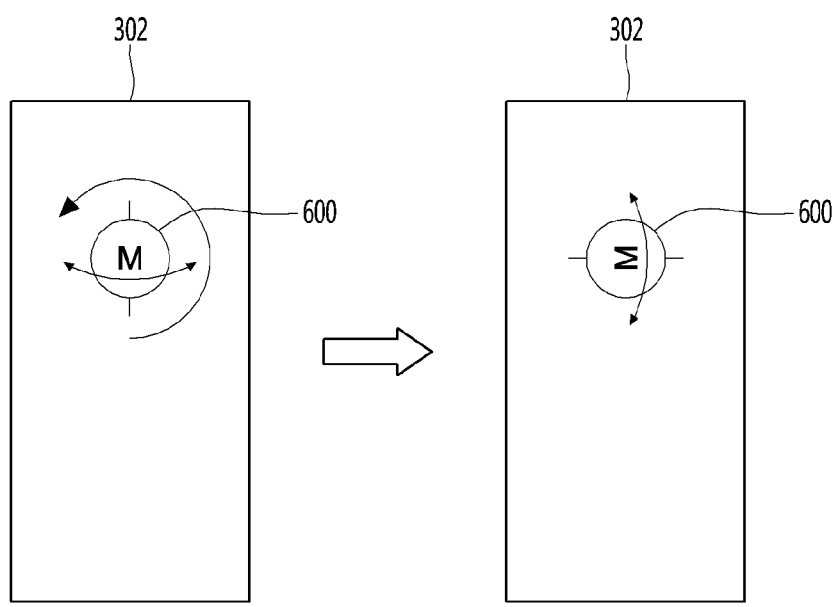
FIG. 13 is an exemplary view illustrating movement of a rotational shaft of a vibration element in accordance with an embodiment of the present disclosure.

FIG. 13 is an exemplary view illustrating a movement of a rotational shaft of a vibration element in accordance with an embodiment of the present disclosure.

Referring to FIG. 13, the vibration element 600 may be provided in the band 302, and a rotational shaft of the vibration element 600 may be disposed in a direction parallel to the band 302. The vibration element 600 may rotate the rotational shaft based on a control signal of the controller 380. Accordingly, the vibration element 600 may rotate the rotational shaft from a direction parallel to the band 302 to a direction perpendicular to the band 302. The vibration element 600 may rotate the rotational shaft from a direction perpendicular to the band 302 to a direction parallel to the band 302, based on the control signal of the controller 380.

Also, as described above, the vibration element 600 may be provided in the main body 301 and rotate the rotational shaft in the main body 301, based on the control signal of the controller 380.

The watch type terminal 300 may further include a band adjustment portion 390 capable of adjusting a length of the band 302.

This will be described below with reference to FIGS. 14 to 16.

Figure 14:
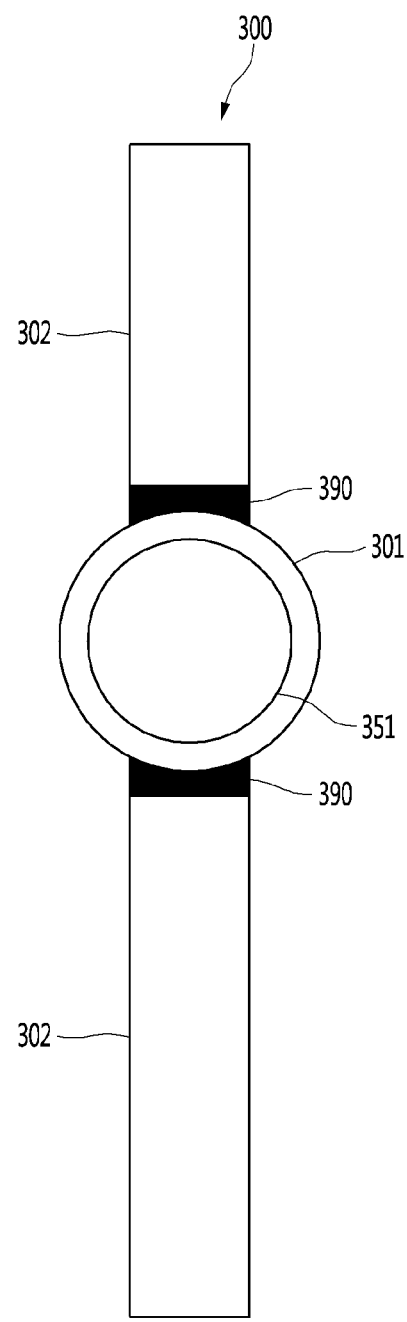
FIG. 14 is an exemplary view illustrating a band adjustment portion in accordance with an embodiment of the present disclosure.

FIG. 14 is an exemplary view illustrating a band adjustment portion in accordance with an embodiment of the present disclosure.

Figure 15:
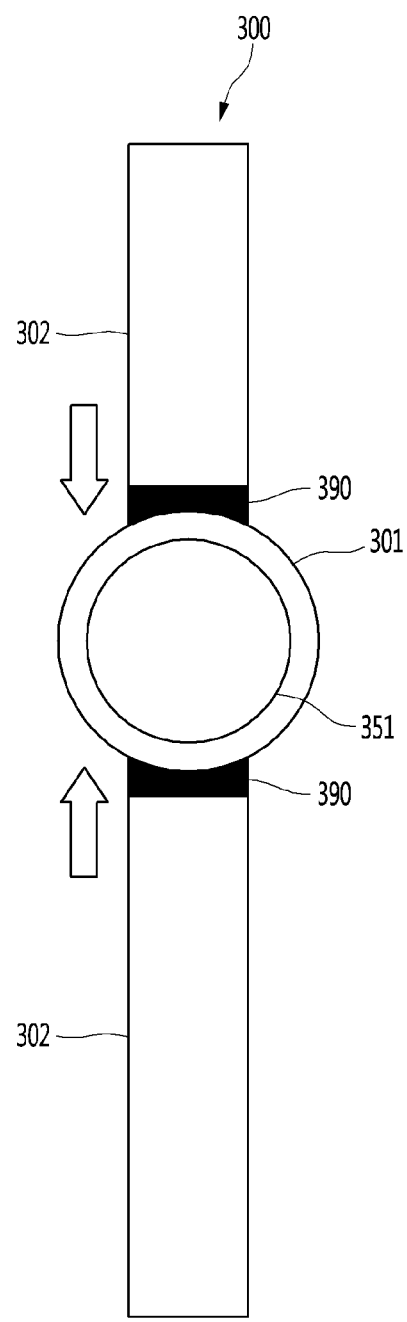
FIG. 15 is an exemplary view illustrating an operation of tightening the band adjustment portion in accordance with an embodiment of the present disclosure.

FIG. 15 is an exemplary view illustrating an operation of tightening the band adjustment portion in accordance with an embodiment of the present disclosure.

Figure 16:
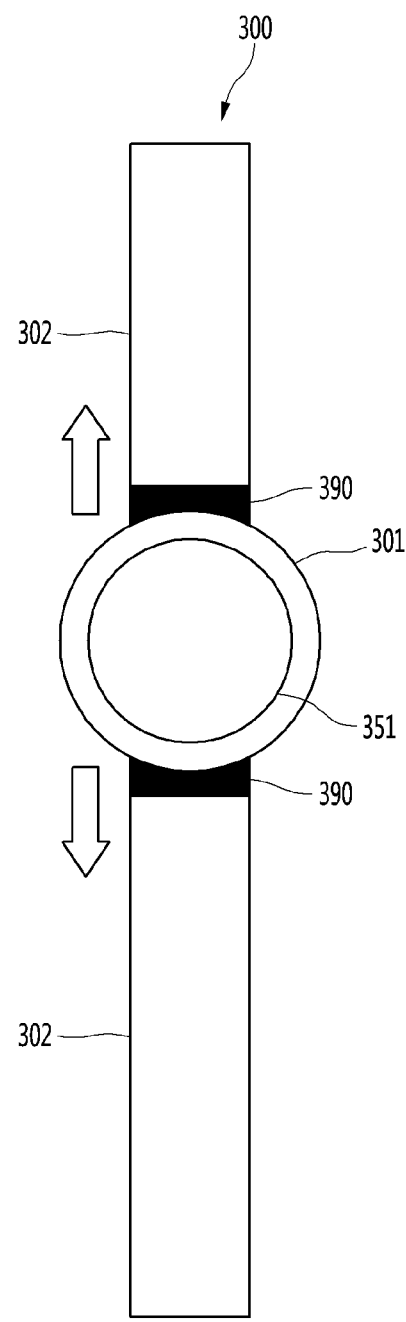
FIG. 16 is an exemplary view illustrating an operation of loosing the band adjustment portion in accordance with an embodiment of the present disclosure.

FIG. 16 is an exemplary view illustrating an operation of loosing the band adjustment portion in accordance with an embodiment of the present disclosure.

Referring to FIG. 14, the band adjustment portion 390 may be provided between the main body 301 and the band 302 and adjust the length of the band 302. The band adjustment portion 390 may increase or decrease the length of the band 302 based on the control signal of the controller 380.

Referring to FIG. 15, the band adjustment portion 390 may operate to increase or decrease the length of the band 302 based on the control signal of the controller 380. Accordingly, the band adjustment portion 390 may perform an operation of tightening the band 302 in a direction toward the main body 301.

Referring to FIG. 16, the band adjustment portion 390 may operate to increase the length of the band 302 based on the control signal of the controller 380. Accordingly, the band adjustment portion 390 may perform an operation of loosing the band 302 in a direction opposite to the main body 301.

On the other hand, the controller 380 may control the band adjustment portion 309 to decrease the length of the band 302 during the operation of the haptic module 354. Accordingly, the user can more easily recognize the operation of the haptic module 354. This will be described below.

An operation method of a watch type terminal in accordance with the present disclosure will be described below with reference to FIG. 17.

FIG. 17 is a flowchart of an operation method of a watch type terminal in accordance with an embodiment of the present disclosure.

Referring to FIG. 17, the controller 380 of the watch type terminal 300 acquires a user input for setting an alarm operation corresponding to one or more events (S101).

The controller 380 may acquire the user input through one or more of the user input unit 323 and the touch sensor provided in the display unit 351.

The controller 380 may acquire a user input of selecting one of a plurality of events through one or more of the user input unit 323 and the touch sensor provided in the display unit 351, and acquire a user input for setting a vibration alarm operation corresponding to the selected event.

The controller 380 may acquire the user input for setting vibration alarm operations corresponding to various events for the watch type terminal 300 through one or more of the user input unit 323 and the touch sensor provided in the display unit 351. The events for the watch type terminal 300 may include one or more of a call signal reception, a message reception, a phone call reception, a key signal input, a touch input, a schedule notification, an application notification, a time notification, and a state notification of the watch type terminal 300. The controller 380 may acquire a user input for setting one or more of an operation pattern, an operation direction, an operation strength, an operation time, and an operation speed of the vibration alarm operation, and a rotating direction of the vibration element 600.

For example, the controller 380 may acquire a user input of selecting one of a plurality of events for the watch type terminal 300, and acquire a user input for setting an alarm operation corresponding to the selected event.

According to an embodiment, the controller 380 may acquire a user input of selecting a message reception event and acquire a user input for setting an alarm operation corresponding to the message reception event.

According to another embodiment, the controller 380 may acquire a user input of selecting a phone call reception event and acquire a user input for setting an alarm operation corresponding to the phone call reception event.

According to further another embodiment, the controller 380 may acquire a user input of selecting a schedule notification event and acquire a user input for setting an alarm operation corresponding to the schedule notification event.

Also, the controller 380 may acquire a user input for setting alarm operations corresponding to a plurality of events with respect to a specific other party or a specific terminal. Accordingly, the controller 380 may set different alarm operations to the case of receiving a message from the other party A and the case of receiving a message from the other party B, with respect to the same event of message reception.

Also, the controller 380 may acquire a user input for setting alarm operations corresponding to importance of each of the plurality of events. Accordingly, the controller 380 may set different alarm operations to a schedule having high importance and a schedule having low importance, with respect to the same event of schedule notification.

On the other hand, the controller 380 may acquire a user input for setting a vibration alarm to the watch type terminal 300 including the plurality of vibration elements 600.

The controller 180 may set one or more of an operation pattern, an operation direction, an operation strength, an operation speed, and an operation time of the vibration alarm operation corresponding to the event selected based on the acquired user input, and a rotating direction of the vibration element 600.

First, the operation direction and the operation speed of the vibration alarm will be described with reference to FIGS. 18 to 20.

Figure 18A:
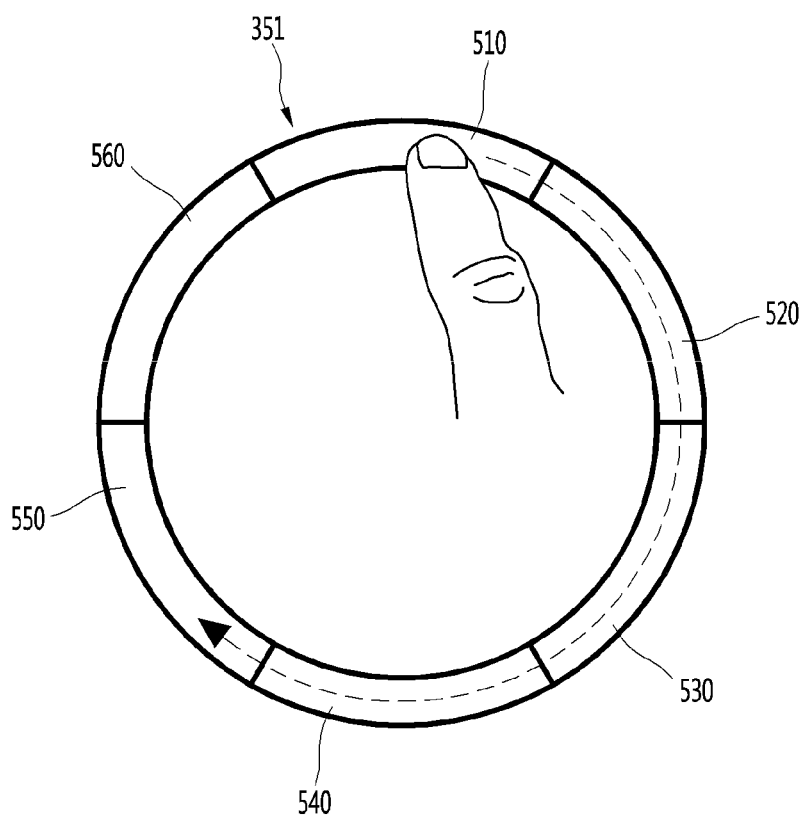
FIG. 18A is an exemplary view illustrating a setting of a vibration alarm operation in accordance with an embodiment of the present disclosure.

FIG. 18A is an exemplary view illustrating a setting of a vibration alarm operation in accordance with an embodiment of the present disclosure.

Figure 18B:
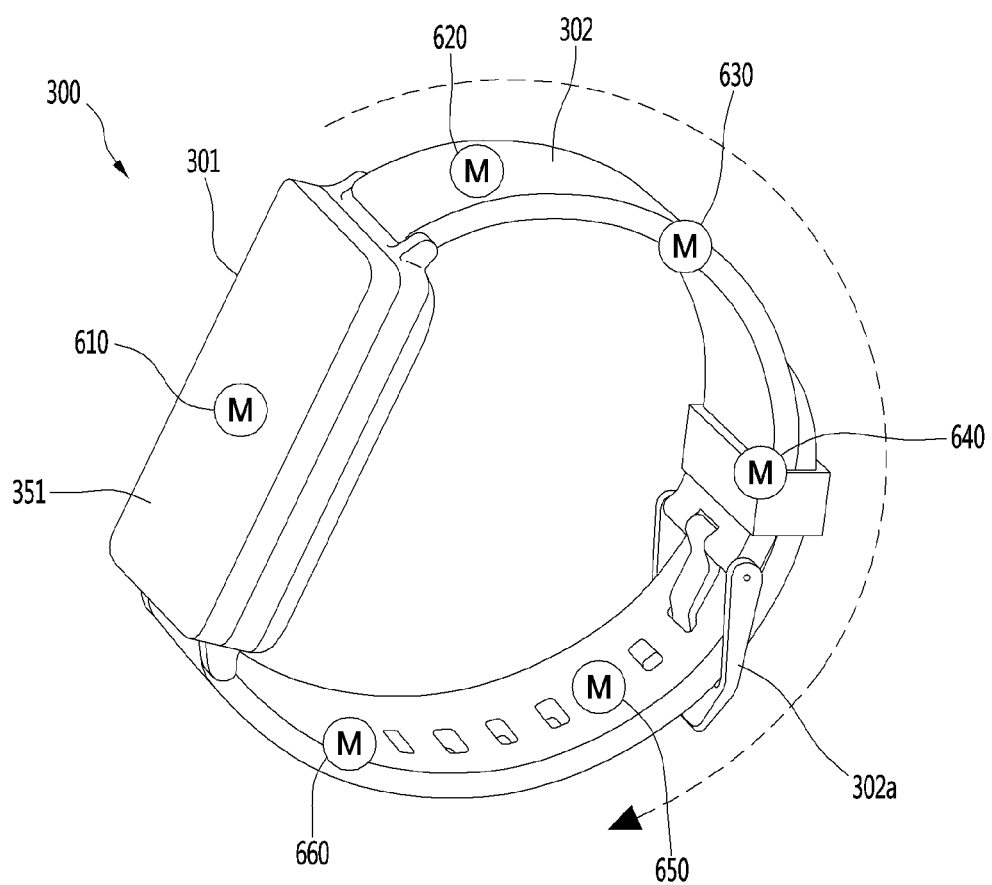
FIG. 18B is an exemplary view illustrating a vibration alarm operation in accordance with an embodiment of the present disclosure.

FIG. 18B is an exemplary view illustrating a vibration alarm operation in accordance with an embodiment of the present disclosure.

Figure 19A:
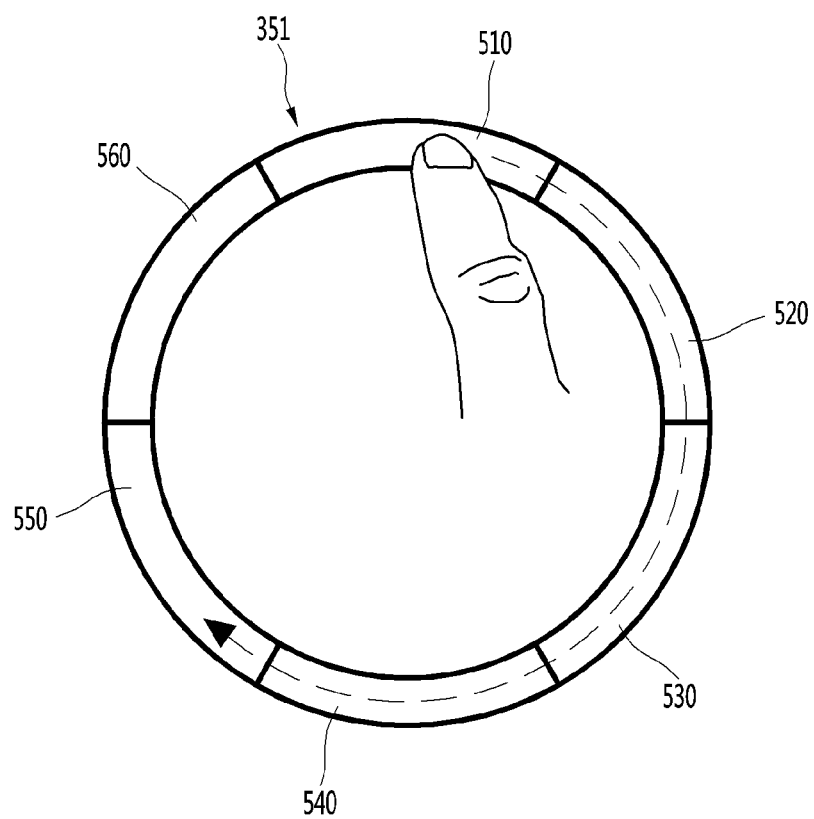
FIG. 19A is an exemplary view illustrating a setting of a vibration alarm operation in accordance with another embodiment of the present disclosure.

FIG. 19A is an exemplary view illustrating a setting of a vibration alarm operation in accordance with another embodiment of the present disclosure.

Figure 19B:
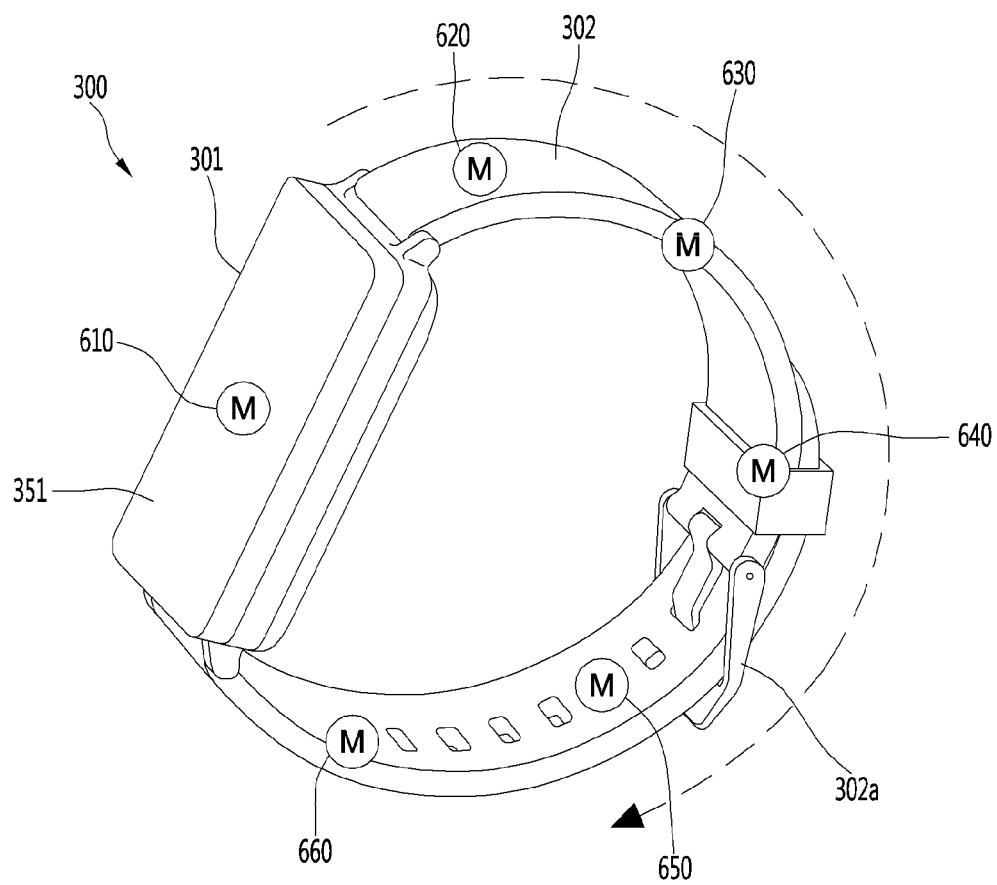
FIG. 19B is an exemplary view illustrating a vibration alarm operation in accordance with another embodiment of the present disclosure.

FIG. 19B is an exemplary view illustrating a vibration alarm operation in accordance with another embodiment of the present disclosure.

Figure 20A:
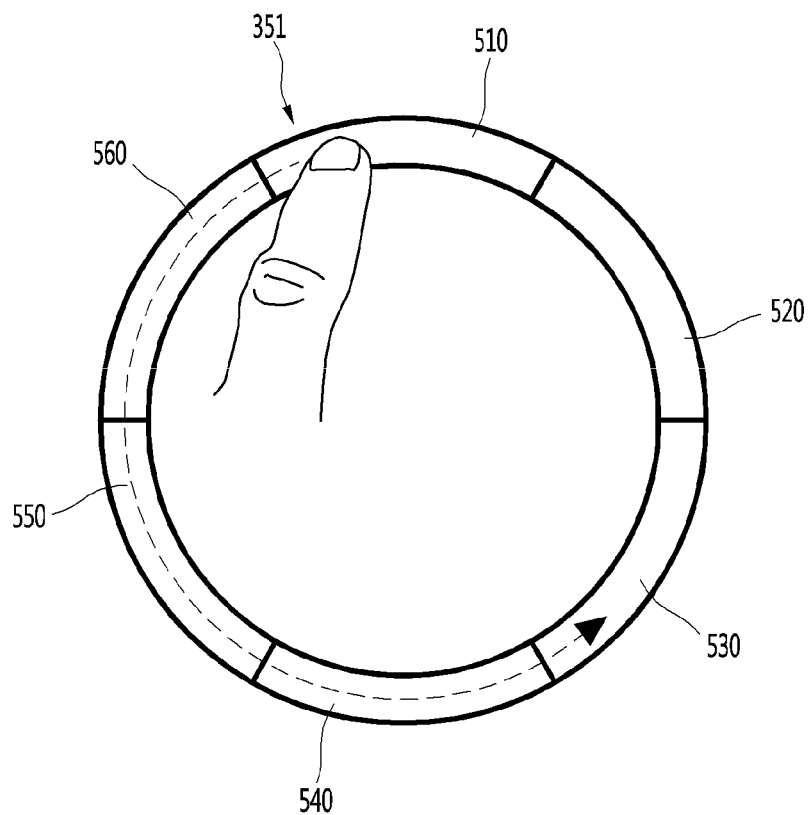
FIG. 20A is an exemplary view illustrating a setting of a vibration alarm operation in accordance with further another embodiment of the present disclosure.

FIG. 20A is an exemplary view illustrating a setting of a vibration alarm operation in accordance with further another embodiment of the present disclosure.

Figure 20B:
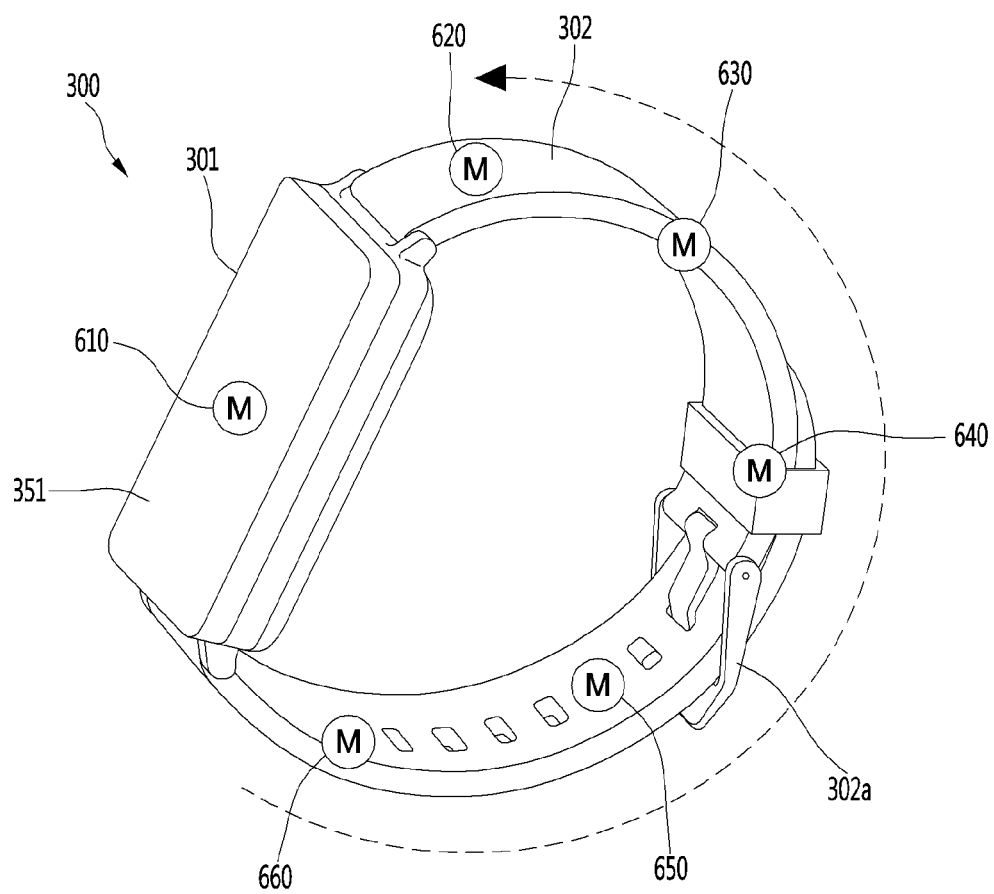
FIG. 20B is an exemplary view illustrating a vibration alarm operation in accordance with further another embodiment of the present disclosure.

FIG. 20B is an exemplary view illustrating a vibration alarm operation in accordance with further another embodiment of the present disclosure.

Referring to FIG. 18A, when the controller 380 acquires a user input of touching a plurality of regions 510, 520, 530, 540, 550, and 560 displayed on the display unit 351 at a first speed in a clockwise direction, the controller 380 may set a vibrating operation of vibrating a plurality of vibration elements 610, 620, 630, 640, 650, and 660 in sequential order at the first speed as a vibration alarm for a selected first event. Accordingly, as illustrated in FIG. 18B, when the selected first event occurs, the controller 380 may perform control such that the plurality of vibration elements 610, 620, 630, 640, 650, and 660 vibrate in sequential order at the first speed. The selected first event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

Referring to FIG. 19A, when the controller 380 acquires a user input of touching a plurality of regions 510, 520, 530, 540, 550, and 560 displayed on the display unit 351 at a second speed in a clockwise direction, the controller 380 may set a vibrating operation of vibrating a plurality of vibration elements 610, 620, 630, 640, 650, and 660 in sequential order at the second speed as a vibration alarm for a selected second event. Accordingly, as illustrated in FIG. 19B, when the selected second event occurs, the controller 380 may perform control such that the plurality of vibration elements 610, 620, 630, 640, 650, and 660 vibrate in sequential order at the second speed. The selected second event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal. The second speed may be faster than the first speed.

Referring to FIG. 20A, when the controller 380 acquires a user input of touching a plurality of regions 510, 520, 530, 540, 550, and 560 displayed on the display unit 351 at a first speed in a counterclockwise direction, the controller 380 may set a vibrating operation of vibrating a plurality of vibration elements 610, 620, 630, 640, 650, and 660 in sequential order at the first speed as a vibration alarm for a selected third event. Accordingly, as illustrated in FIG. 20B, when the selected third event occurs, the controller 380 may perform control such that the plurality of vibration elements 610, 620, 630, 640, 650, and 660 vibrate in reverse order at the first speed. The selected third event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

A rotating direction of a vibration element according to a vibration alarm operation will be described with reference to FIGS. 21 and 22.

Figure 21:
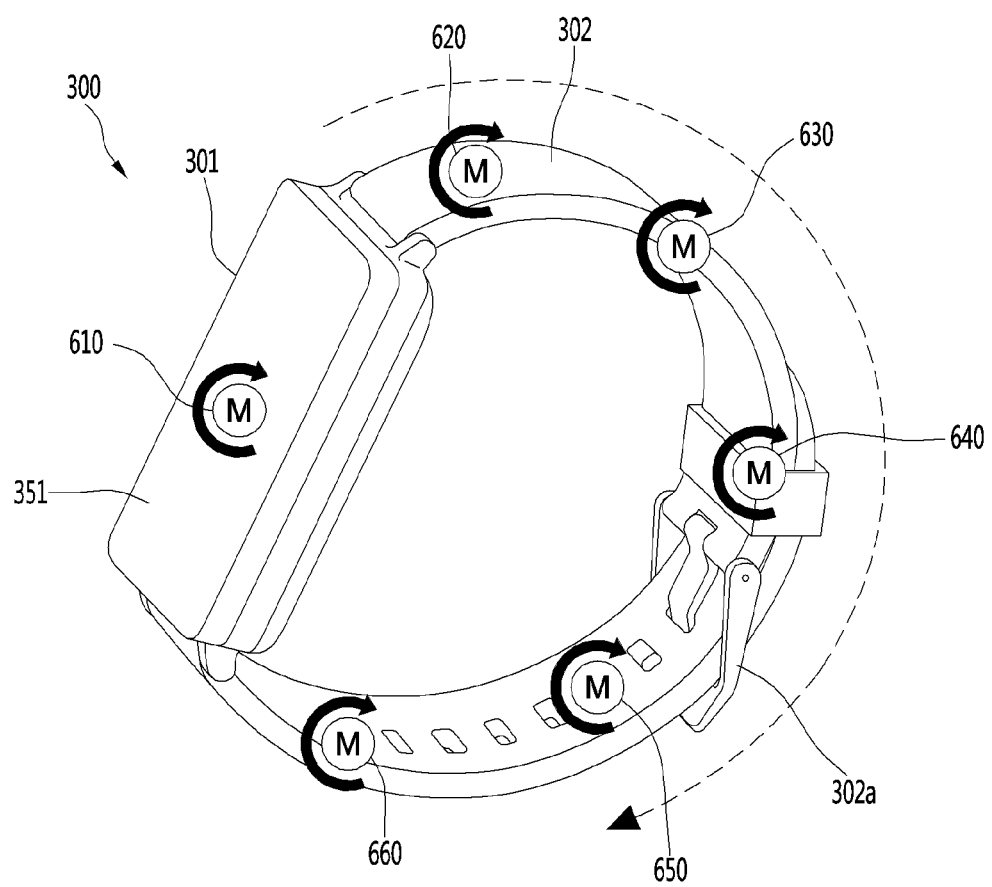
FIG. 21 is an exemplary view illustrating rotation of vibration elements in accordance with an embodiment of the present disclosure.

FIG. 21 is an exemplary view illustrating rotation of vibration elements in accordance with an embodiment of the present disclosure.

Figure 22:
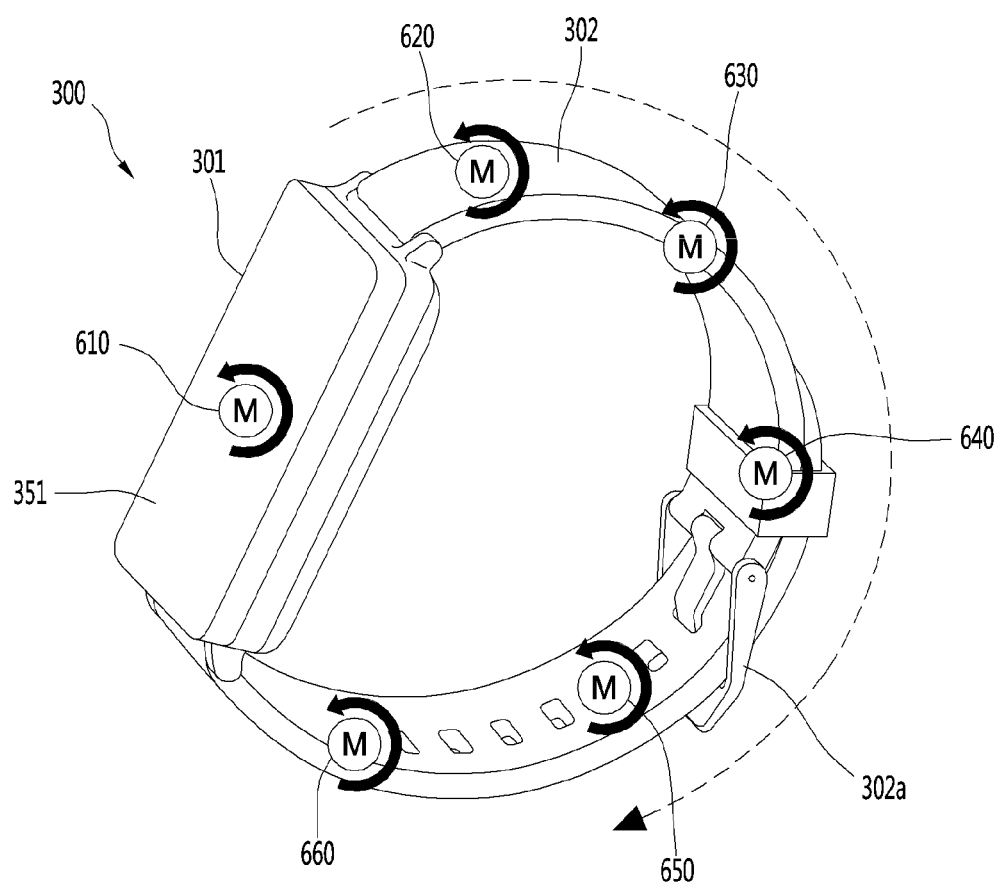
FIG. 22 is an exemplary view illustrating rotation of vibration elements in accordance with another embodiment of the present disclosure.

FIG. 22 is an exemplary view illustrating rotation of vibration elements in accordance with another embodiment of the present disclosure.

Referring to FIG. 21, the controller 380 may set a vibrating operation of rotating a plurality of vibration elements 610, 620, 630, 640, 650, and 660 in a vibrating direction as a vibration alarm for a fourth event. Accordingly, when the selected fourth event occurs, the controller 380 may perform control such that the plurality of vibration elements 610, 620, 630, 640, 650, and 660 vibrate in sequential order in the vibrating direction. The selected fourth event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

Referring to FIG. 22, the controller 380 may set a vibrating operation of rotating a plurality of vibration elements 610, 620, 630, 640, 650, and 660 in a direction opposite to a vibrating direction as a vibration alarm for a fifth event. Accordingly, when the selected fifth event occurs, the controller 380 may perform control such that the plurality of vibration elements 610, 620, 630, 640, 650, and 660 vibrate in sequential order in a direction opposite to the vibrating direction. The selected fifth event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

The operation of rotating the vibration element 600 in the vibrating direction or the direction opposite to the vibrating direction is substantially the same as the operation of rotating the vibration element 600 in the direction parallel to the length direction of the main body 301 or the band 302.

On the other hand, based on an acquired user input, the controller 380 may set a vibrating operation of rotating a plurality of vibration elements in a direction perpendicular to a vibrating direction, as a vibration alarm for a selected event.

This will be described below with reference to FIGS. 23 and 24.

Figure 23:
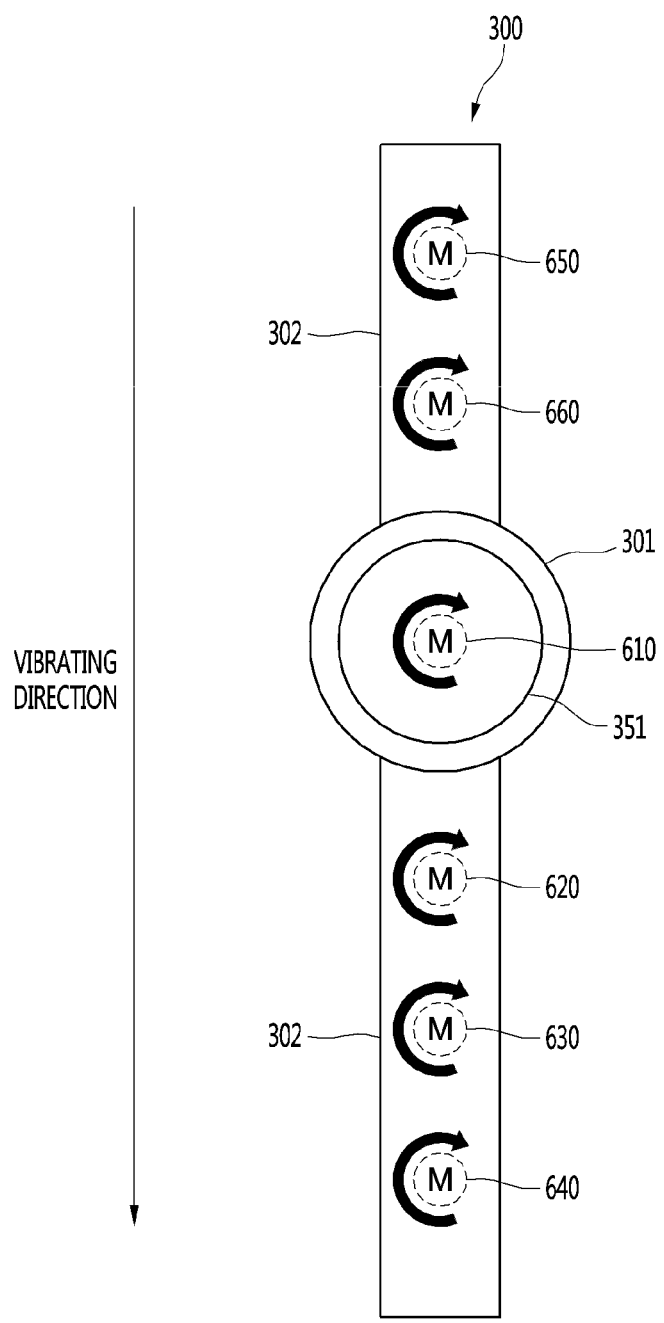
FIG. 23 is an exemplary view illustrating rotation of vibration elements in accordance with further another embodiment of the present disclosure.

FIG. 23 is an exemplary view illustrating rotation of vibration elements in accordance with further another embodiment of the present disclosure.

Figure 24:
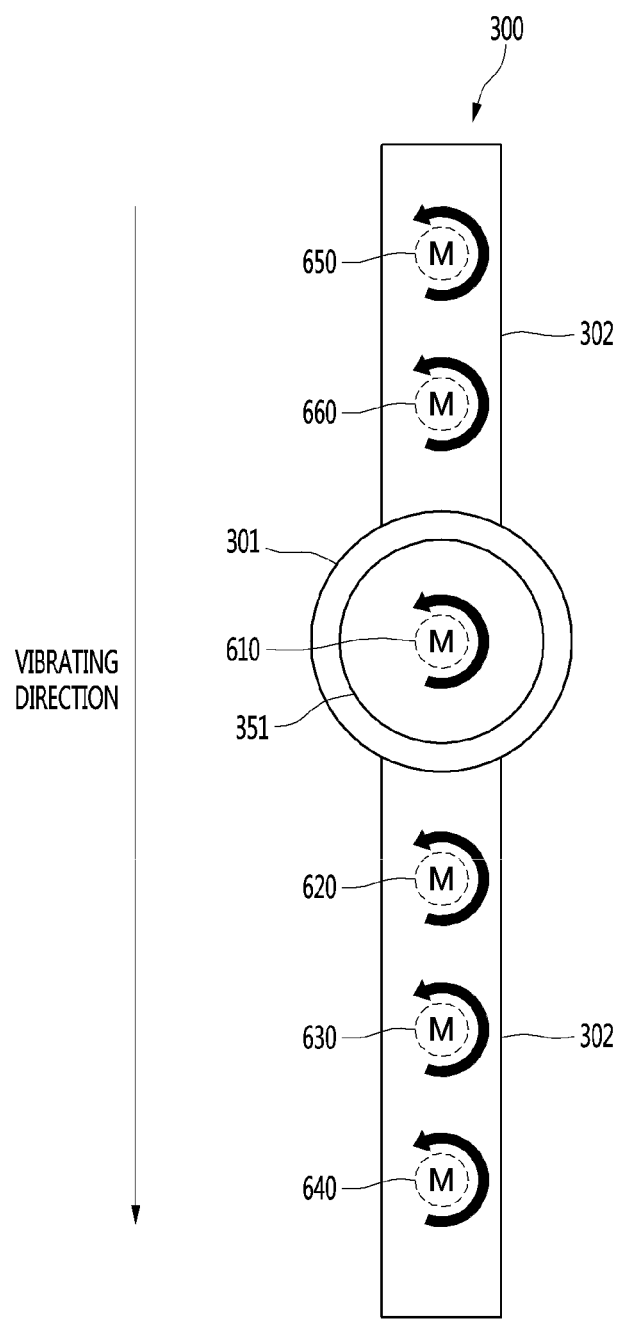
FIG. 24 is an exemplary view illustrating rotation of vibration elements in accordance with further another embodiment of the present disclosure.

FIG. 24 is an exemplary view illustrating rotation of vibration elements in accordance with further another embodiment of the present disclosure.

Referring to FIG. 23, when a plurality of vibration elements 610, 620, 630, 640, 650, and 660 rotate in a direction perpendicular to a vibrating direction, the controller 380 may set a vibrating operation of rotating the plurality of vibration elements 610, 620, 630, 640, 650, and 660 in a clockwise direction as a vibration alarm for a sixth event. Accordingly, when the selected sixth event occurs, the controller 380 may perform control such that the plurality of vibration elements 610, 620, 630, 640, 650, and 660 vibrate in sequential order from a direction perpendicular to the vibrating direction to a clockwise direction. The selected sixth event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

Referring to FIG. 24, when a plurality of vibration elements 610, 620, 630, 640, 650, and 660 rotate in a direction perpendicular to a vibrating direction, the controller 380 may set a vibrating operation of rotating the plurality of vibration elements 610, 620, 630, 640, 650, and 660 in a counterclockwise direction as a vibration alarm for a seventh event. Accordingly, when the selected sixth event occurs, the controller 380 may perform control such that the plurality of vibration elements 610, 620, 630, 640, 650, and 660 vibrate in sequential order from a direction perpendicular to the vibrating direction to a counterclockwise direction. The selected seventh event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

The operation of rotating the vibration element in the direction perpendicular to the vibrating direction is substantially the same as the operation of rotating the vibration element 600 in the direction perpendicular to the length direction of the main body 301 or the band 302.

Also, the controller 380 may set one or more of an operation strength and an operation time of the vibration element corresponding to the selected region, based on one or more of a user touch input time and a user touch input strength on one of a plurality of regions displayed on the display unit 351.

For example, when the user touch input time on the first region 510 is a first time, the controller 380 may control the first vibration element 610 to operate with a first vibrating operation strength. When the user touch input time on the first region 510 is a second time, the controller 380 may control the first vibration element 610 to operate with a second vibrating operation strength.

As another example, when the user touch input time on the first region 510 is a first time, the controller 380 may control the first vibration element 610 to operate for a first vibrating operation time. When the user touch input time on the first region 510 is a second time, the controller 380 may control the first vibration element 610 to operate for a second vibrating operation time.

As further another example, when the user touch input strength on the first region 510 is a first strength, the controller 380 may control the first vibration element 610 to operate with a first vibrating operation strength. When the user touch input strength on the first region 510 is a second strength, the controller 380 may control the first vibration element 610 to operate with a second vibrating operation strength.

As still another example, when the user touch input strength on the first region 510 is a first strength, the controller 380 may control the first vibration element 610 to operate for a first vibrating operation time. When the user touch input strength on the first region 510 is a second strength, the controller 380 may control the first vibration element 610 to operate for a second vibrating operation time.

On the other hand, the controller 380 may set one or more of an operation strength and an operation time of the vibration element corresponding to the selected region, based on one or more of a drag length and the number of drags of a user touch input with respect to one of a plurality of regions displayed on the display unit 351.

This will be described below with reference to FIGS. 25 and 26.

Figure 25:
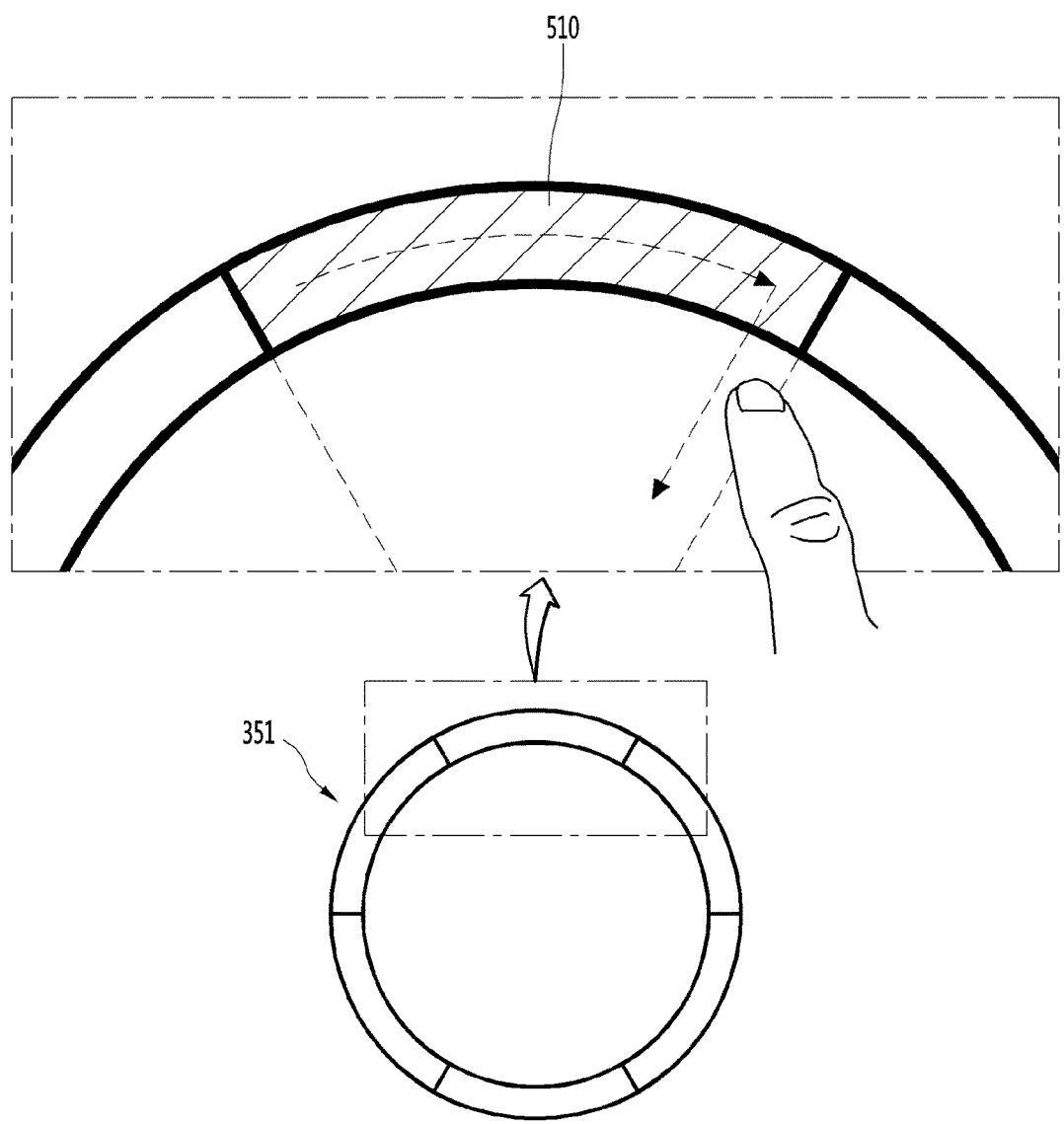
FIG. 25 is an exemplary view illustrating a drag length of a user touch input in accordance with an embodiment of the present disclosure.

FIG. 25 is an exemplary view illustrating a drag length of a user touch input in accordance with an embodiment of the present disclosure.

Referring to FIG. 25, the controller 380 may acquire a user touch input of touching the first region 510 among the plurality of regions displayed on the display unit 351, and when the drag length of the touch input of dragging from the first region 510 toward the center of the display unit 351 is a first length, the controller 380 may control the first vibration element 610 to operate with a first strength. The controller 380 may acquire a user touch input of touching the first region 510 among the plurality of regions displayed on the display unit 351, and when the drag length of the touch input of dragging from the first region 510 toward the center of the display unit 351 is a second length, the controller 380 may control the first vibration element 610 to operate with a second strength.

Figure 26:
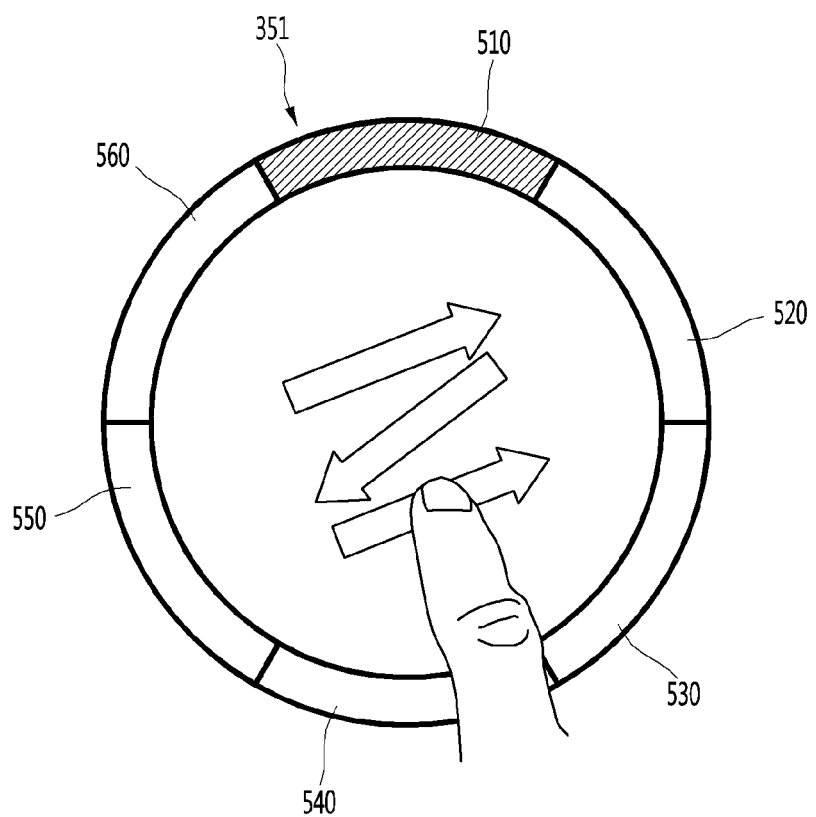
FIG. 26 is an exemplary view illustrating the number of times of drags of a user touch input in accordance with an embodiment of the present disclosure.

FIG. 26 is an exemplary view illustrating the number of times of drags of a user touch input in accordance with an embodiment of the present disclosure.

Referring to FIG. 26, the controller 380 may acquire a user touch input of touching the first region 510 among the plurality of regions displayed on the display unit 351, and when the controller 380 acquires a user touch input of dragging as many as a first reference value or more, the controller 380 may control the first vibration element 610 to operate with a first strength. The controller 380 may acquire a user touch input of touching the first region 510 among the plurality of regions displayed on the display unit 351, and when the controller 380 acquires a user touch input of dragging as many as a second reference value or more, the controller 380 may control the first vibration element 610 to operate with a second strength.

On the other hand, the controller 380 may set a vibration alarm for a selected event, based on one or more of an operation pattern, an operation direction, an operation strength, an operation time, and an operation speed of the vibration alarm operation for the plurality of vibration elements 600, and a rotating direction of the vibration elements 600, as described above. The operation pattern may include a vibration or non-vibration, a vibrating direction, and the number of vibrations of one or more vibration elements among the plurality of vibration elements 600, and a vibrating order of the plurality of vibration elements 600.

This will be described below with reference to FIGS. 27 to 29.

Figure 27:
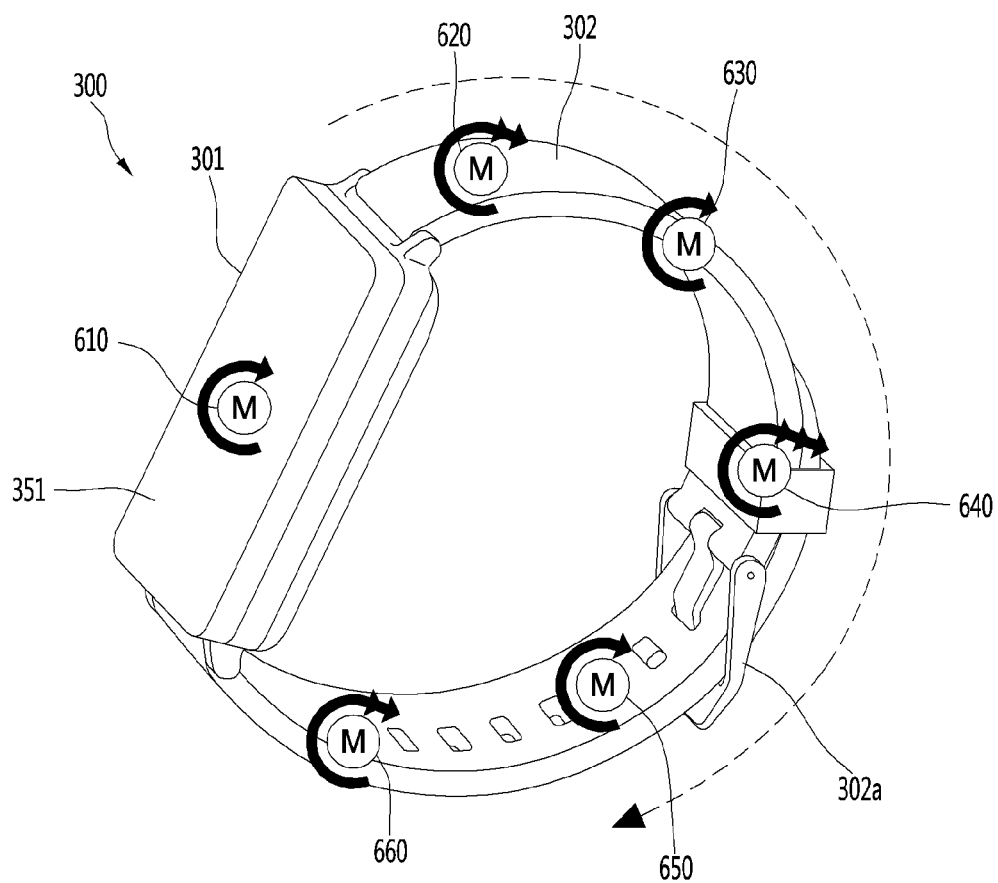
FIG. 27 is an exemplary view illustrating a vibration alarm operation based on a setting of a vibration alarm in accordance with an embodiment of the present disclosure.

FIG. 27 is an exemplary view illustrating a vibration alarm operation based on a setting of a vibration alarm, in accordance with an embodiment of the present disclosure.

Figure 28:
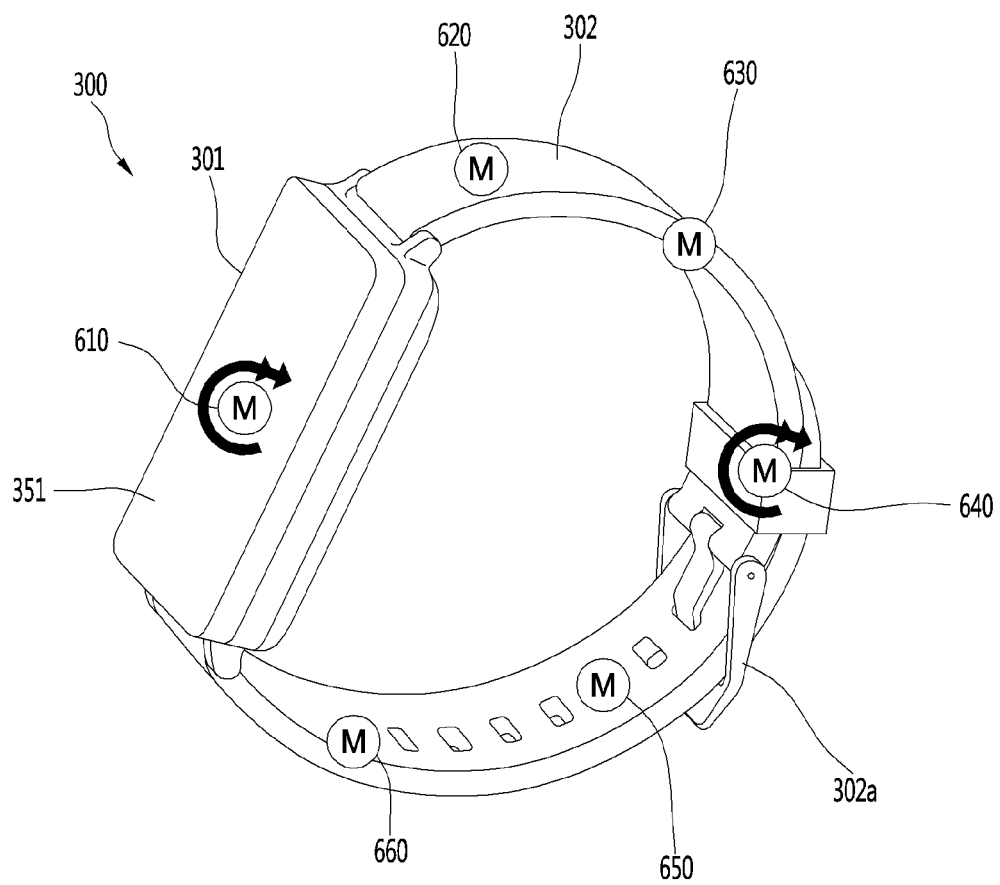
FIG. 28 is an exemplary view illustrating a vibration alarm operation based on a setting of a vibration alarm in accordance with another embodiment of the present disclosure.

FIG. 28 is an exemplary view illustrating a vibration alarm operation based on a setting of a vibration alarm in accordance with another embodiment of the present disclosure.

Figure 29:
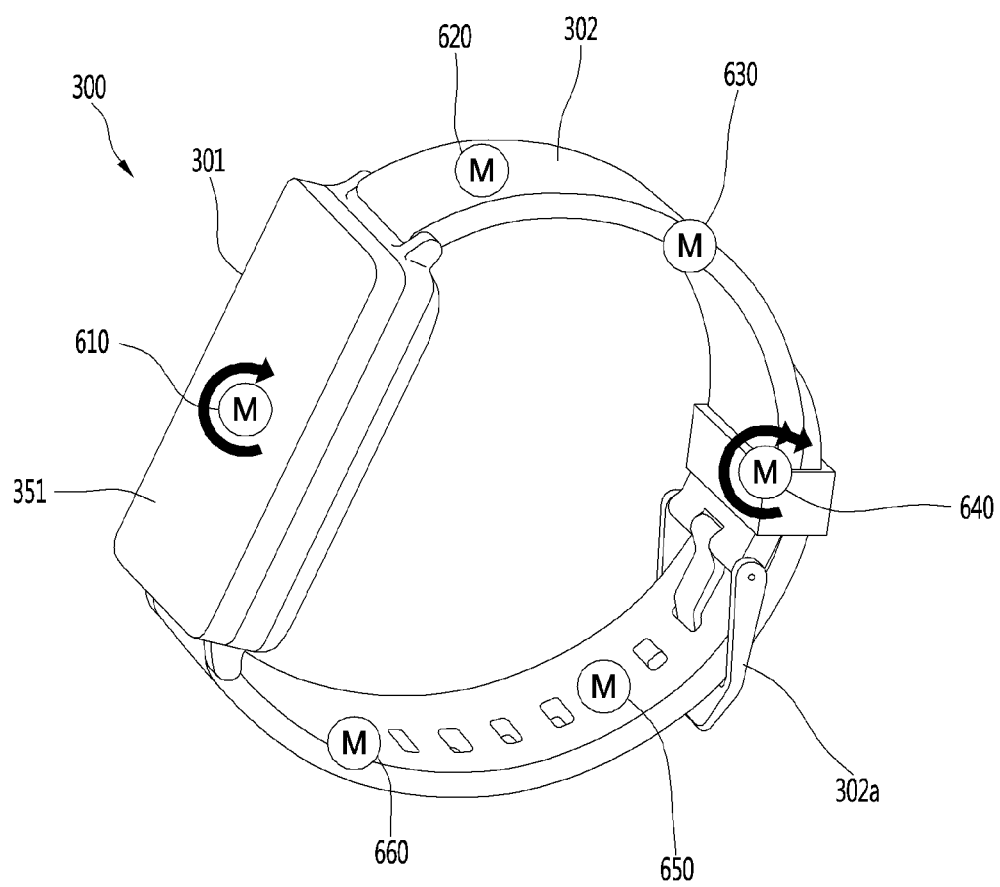
FIG. 29 is an exemplary view illustrating a vibration alarm operation based on a setting of a vibration alarm in accordance with further another embodiment of the present disclosure.

FIG. 29 is an exemplary view illustrating a vibration alarm operation based on a setting of a vibration alarm in accordance with further another embodiment of the present disclosure.

Referring to FIG. 27, when the controller 380 acquires a user input of touching a plurality of regions 510, 520, 530, 540, 550, and 560 displayed on the display unit 351 at a first speed in a clockwise direction, the controller 380 may set a vibrating operation of vibrating a plurality of vibration elements 610, 620, 630, 640, 650, and 660 in sequence at the first speed as a vibration alarm for a selected eighth event. Based on one or more of a drag length and the number of drags of a user touch input, the controller 380 may set the first vibration element 610, the third vibration element 630, and the fifth vibration element 650 respectively corresponding to the first region 510, the third region 530, and the fifth region 550 to perform a vibrating operation with a first strength, set the second vibration element 620 and the sixth vibration element 660 respectively corresponding to the second region 520 and the sixth region 560 to perform a vibrating operation with a second strength, and set the fourth vibration element 640 corresponding to the fourth region 540 to perform a vibrating operation with a third strength. Accordingly, when the selected eighth event occurs, the controller 380 may perform control such that the plurality of vibration elements 610, 620, 630, 640, 650, and 660 perform the vibrating operations in sequential order at the first speed, the first vibration element 610, the third vibration element 630, and the fifth vibration element 650 perform the vibrating operations with the first strength, the second vibration element 620 and the sixth vibration element 660 perform the vibrating operations with the second strength, and the fourth vibration element 640 performs the vibrating operation with the third strength. The selected eighth event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

Referring to FIG. 28, when the controller 380 acquires a user input of touching a plurality of regions 510 and 540 displayed on the display unit 351 simultaneously or sequentially, the controller 380 may set a vibrating operation of vibrating a plurality of vibration elements 610 and 640 with a second strength simultaneously or sequentially as a vibration alarm for a selected ninth event. The controller 380 may set the first vibration element 610 and the fourth vibration element 640 corresponding to the first region 510 and the fourth region 540 to perform vibrating operations with a second strength, based on one or more of a drag length and the number of drags of a user touch input. Accordingly, when the selected ninth event occurs, the controller 380 may perform control such that the plurality of vibration elements 610 and 640 perform the vibrating operations with the second strength simultaneously or sequentially. The selected ninth event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

Referring to FIG. 29, when the controller 380 acquires a user input of touching a plurality of regions 510 and 540 displayed on the display unit 351 simultaneously or sequentially, the controller 380 may set a vibrating operation of vibrating a plurality of vibration elements 610 and 640 respectively with a first strength and a second strength simultaneously or sequentially as a vibration alarm for a selected tenth event. The controller 380 may set the first vibration element 610 and the fourth vibration element 640 corresponding to the first region 510 and the fourth region 540 to perform vibrating operations respectively with a first strength and a second strength, based on one or more of a drag length and the number of drags of a user touch input. Accordingly, when the selected tenth event occurs, the controller 380 may perform control such that the plurality of vibration elements 610 and 640 perform the vibrating operations respectively with the first strength and the second strength simultaneously or sequentially. The selected tenth event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

On the other hand, the controller 380 may set vibration alarm operations having various patterns, based on the vibration alarm setting input of the user with respect to the selected event.

For example, the controller 380 may set a pattern in which the plurality of vibration elements 600 sequentially perform the vibrating operations in one direction and then sequentially perform the vibrating operations in another direction at a certain time point, as the vibration alarm operation for the selected event.

As another example, the controller 380 may set a pattern in which the plurality of vibration elements 600 sequentially perform the vibrating operations in one direction and repeat the vibrating operations a predetermined number of times, as the vibration alarm operation for the selected event.

As further another example, the controller 380 may set a pattern in which the plurality of vibration elements 600 perform the vibrating operations in a plurality of progress directions sequentially or simultaneously, as the vibration alarm operation for the selected event. This will be described below with reference to FIG. 30.

Figures 30, 31:
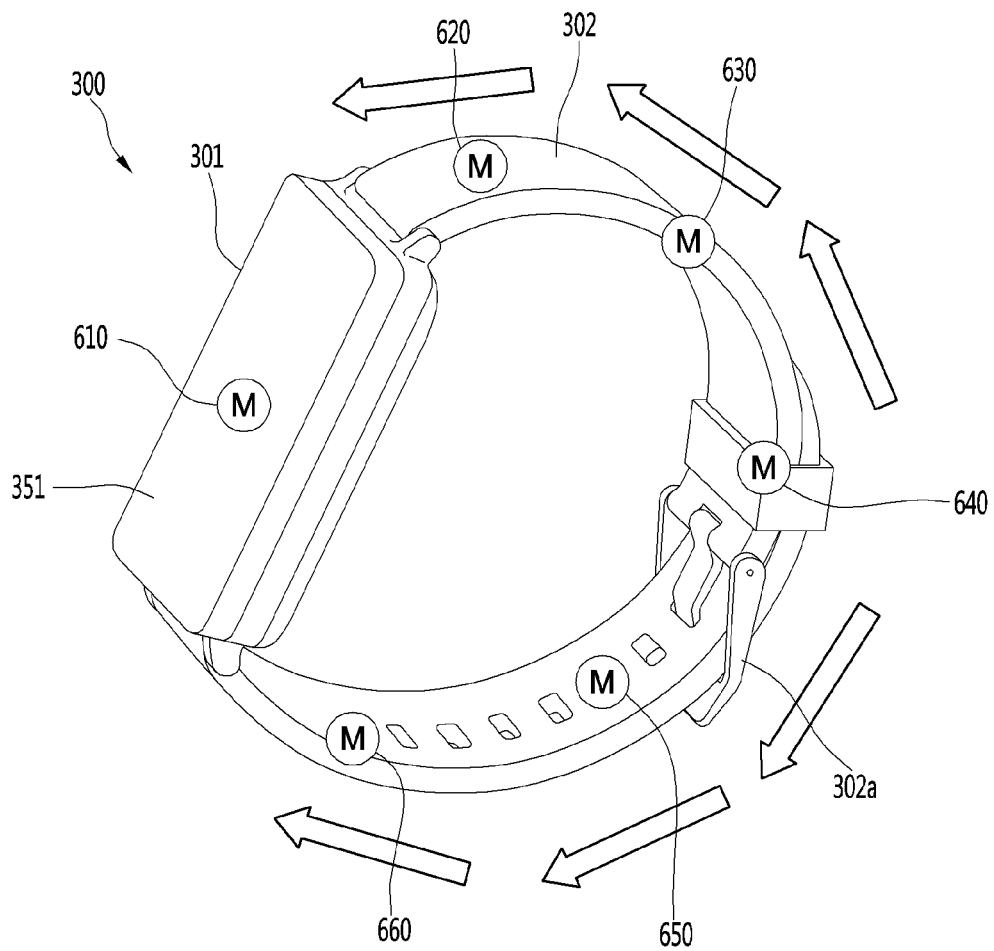
FIG. 30 is an exemplary view illustrating a vibrating operation pattern with respect to a plurality of directions in accordance with an embodiment of the present disclosure.
FIG. 31 is an exemplary view illustrating vibrating operation patterns in accordance with an embodiment of the present disclosure.

FIG. 30 is an exemplary view illustrating vibrating operation patterns with respect to a plurality of directions in accordance with an embodiment of the present disclosure.

Referring to FIG. 30, based on the acquired user input, the controller 380 may set a pattern in which the plurality of vibration elements 610, 620, 630, 640, 650, and 660 perform vibrating operations in a first direction and a second direction sequentially or simultaneously, as a vibration alarm for an eleventh event, wherein the first direction is a direction in which the fourth vibration element 640, the third vibration element 630, the second vibration element 620, and the first vibration element 610 perform the vibrating operations in this order, and the second direction is a direction in which the fourth vibration element 640, the fifth vibration element 650, the sixth vibration element 660, and the first vibration element 610 perform the vibrating operations in this order. Accordingly, when the selected eleventh event occurs, the controller 380 may perform control such that the plurality of vibration elements 610, 620, 630, 640, 650, and 660 perform the vibrating operations in a first direction and a second direction sequentially or simultaneously, wherein the first direction is a direction in which the fourth vibration element 640, the third vibration element 630, the second vibration element 620, and the first vibration element 610 perform the vibrating operations in this order, and the second direction is a direction in which the fourth vibration element 640, the fifth vibration element 650, the sixth vibration element 660, and the first vibration element 610 perform the vibrating operations in this order. The selected eleventh event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

On the other hand, based on an acquired user input, the controller 380 may set a pattern in which the plurality of vibration elements 600 perform vibrating operations with different vibration strengths and at different time intervals, as a vibration alarm for a selected event.

This will be described below with reference to FIGS. 31 to 33.

FIG. 31 is an exemplary view illustrating vibrating operation patterns in accordance with an embodiment of the present disclosure.

FIG. 32 is an exemplary view illustrating vibrating operation patterns in accordance with another embodiment of the present disclosure.

FIG. 33 is an exemplary view illustrating vibrating operation patterns in accordance with further another embodiment of the present disclosure.

For convenience of description, it is assumed in FIGS. 31 to 33 that the plurality of vibration elements 600 include the first vibration element 610, the second vibration element 620, and the third vibration element 630. In the tables of FIGS. 31 to 33, a vertical axis indicates a plurality of vibration elements 610, 620, and 630, and each box of each vibration element indicates a vibration strength. Accordingly, one box of each vibration element indicates a first strength, two boxes indicate a second strength, and three boxes indicate a third strength. In the tables of FIGS. 31 to 33, a horizontal axis indicates a time.

Referring to FIG. 31, based on an acquired user input, the controller 380 may set a pattern in which the first vibration element 610 among the plurality of vibration elements 610, 620, and 630 performs the vibrating operation with the first strength at t1 to t6, the second vibration element 620 performs the vibrating operation with the second strength at t1 to t6, and the third vibration element 630 performs the vibrating operation with the third strength at t1 to t6, as a vibration alarm for a twelfth event. Accordingly, when the selected twelfth event occurs, the controller 380 may perform control such that, at t1 to t6, the first vibration element 610 performs the vibrating operation with the first strength, the second vibration element 620 performs the vibrating operation with the second strength, and the third vibration element 630 performs the vibrating operation with the third strength. The selected twelfth event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

Referring to FIG. 32, based on an acquired user input, the controller 380 may set a pattern in which the first vibration element 610 among the plurality of vibration elements 610, 620, and 630 performs the vibrating operation with the second strength at t1, t3, and t5, the second vibration element 620 performs the vibrating operation with the first strength at t1 to t6, and the third vibration element 630 performs the vibrating operation with the first strength at t1 and t5, performs the vibrating operation with the second strength at t2, t4, and t6, and performs the vibrating operation with the third strength at t3, as a vibration alarm for a thirteenth event. Accordingly, when the selected thirteenth event occurs, the controller 380 may perform control such that the first vibration element 610 performs the vibrating operation with the second strength at t1, t3, and t5, the second vibration element 620 performs the vibrating operation with the first strength at t1 to t6, and the third vibration element 630 performs the vibrating operation with the first strength at t1 and t5, performs the vibrating operation with the second strength at t2, t4, and t6, and performs the vibrating operation with the third strength at t3. The selected thirteen event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

Referring to FIG. 33, based on an acquired user input, the controller 380 may set a pattern in which the first vibration element 610 among the plurality of vibration elements 610, 620, and 630 performs the vibrating operation with the third strength at t1, t2, t6, and t8 and performs the vibrating operation with the second strength at t4, the second vibration element 620 performs the vibrating operation with the third strength at t1, t2, t6, and t8, and the third vibration element 630 performs the vibrating operation with the third strength at t1 and t2, performs the vibrating operation with the second strength at t4, and performs the vibrating operation with the first strength at t6 and t8, as a vibration alarm for a fourteenth event. Accordingly, when the selected fourteenth event occurs, the controller 380 may perform control such that the first vibration element 610 performs the vibrating operation with the third strength at t1, t2, t6, and t8 and performs the vibrating operation with the second strength at t4, the second vibration element 620 performs the vibrating operation with the third strength at t1, t2, t6, and t8, and the third vibration element 630 performs the vibrating operation with the third strength at t1 and t2, performs the vibrating operation with the second strength at t4, and performs the vibrating operation with the third strength at t6 and t8. The selected fourteenth event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

On the other hand, when a plurality of vibration elements 600 are provided at one position, the watch type terminal 300 may set a vibration alarm for a selected event, based on a user input for one or more of an operation pattern, an operation direction, an operation strength, an operation time, and an operation speed of a vibration alarm operation of each of the plurality of vibration elements 600 provided at one position, and a rotating direction of the vibration elements 600. The operation pattern may include a vibration or non-vibration, a vibrating direction, and the number of vibrations of one or more vibration elements among the plurality of vibration elements 600, and a vibrating order of the plurality of vibration elements 600.

This will be described below with reference to FIGS. 34 and 35.

Figure 34:
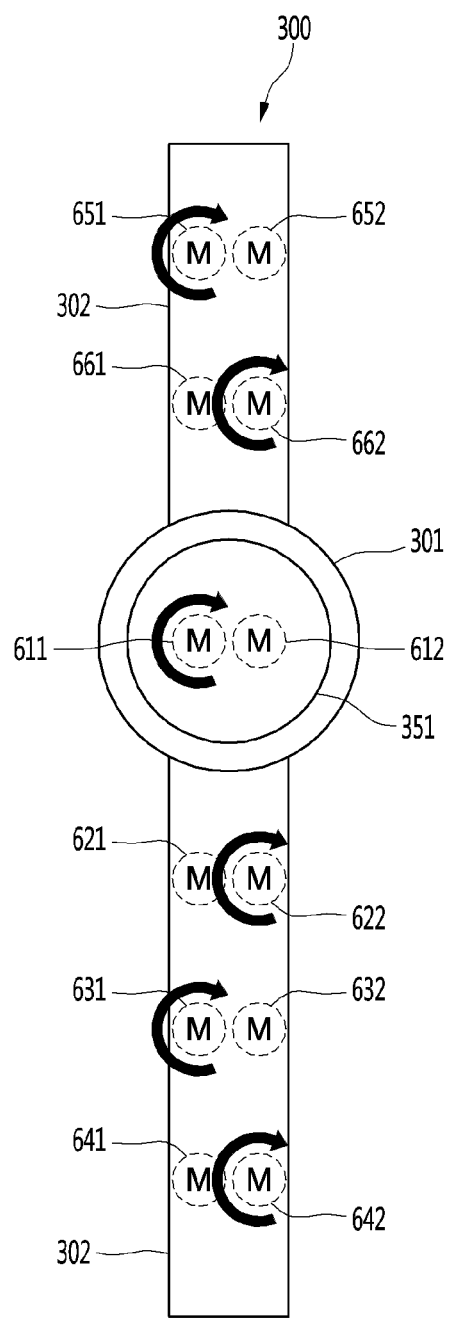
FIG. 34 is an exemplary view illustrating a vibration pattern of a plurality of vibration elements in accordance with an embodiment of the present disclosure.

FIG. 34 is an exemplary view illustrating vibration patterns of a plurality of vibration elements in accordance with an embodiment of the present disclosure.

Figure 35:
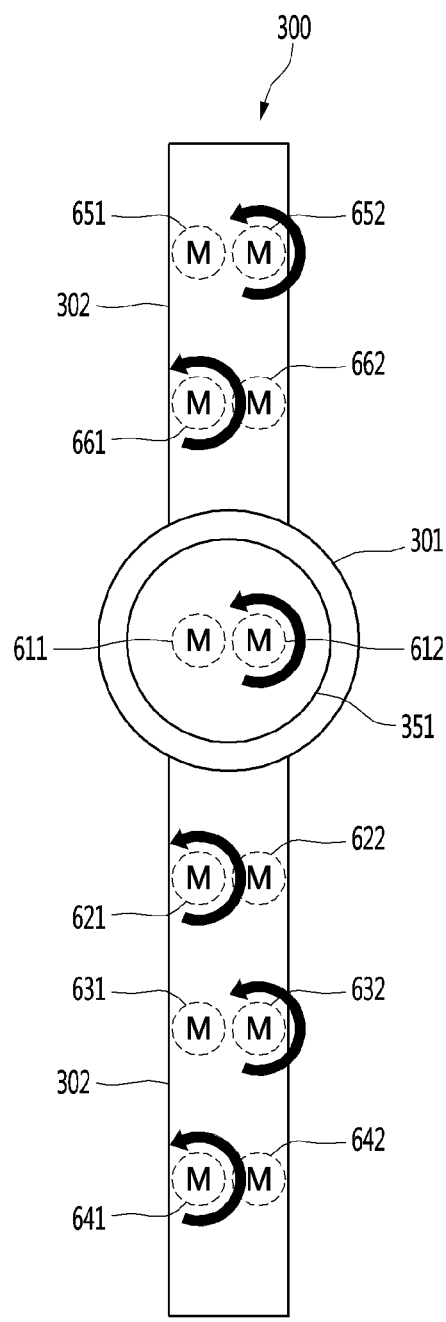
FIG. 35 is an exemplary view illustrating a vibration pattern of a plurality of vibration elements in accordance with another embodiment of the present disclosure.

FIG. 35 is an exemplary view illustrating vibration patterns of a plurality of vibration elements in accordance with another embodiment of the present disclosure.

Referring to FIG. 34, based on an acquired user input, the controller 380 may set a pattern in which vibration elements 611, 622, 631, 642, 651, and 662 set among a plurality of vibration elements 611, 612, 621, 622, 631, 632, 641, 642, 651, 652, 661, and 662 perform a vibrating operation of rotating in a clockwise direction with respect to a direction perpendicular to a length direction of the main body 301 and the band 302, as a vibration alarm for a selected fifteenth event. Accordingly, when the selected fifteenth event occurs, the controller 380 may perform control such that the vibration elements 611, 622, 631, 642, 651, and 662 set among the plurality of vibration elements 611, 612, 621, 622, 631, 632, 641, 642, 651, 652, 661, and 662 perform the vibrating operation of rotating in a clockwise direction with respect to a direction perpendicular to the length direction of the main body 301 and the band 302. The selected fifteenth event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

Referring to FIG. 35, based on an acquired user input, the controller 380 may set a pattern in which vibration elements 612, 621, 632, 641, 652, and 661 set among a plurality of vibration elements 611, 612, 621, 622, 631, 632, 641, 642, 651, 652, 661, and 662 perform a vibrating operation of rotating in a counterclockwise direction with respect to a direction perpendicular to the length direction of the main body 301 and the band 302, as a vibration alarm for a selected sixteenth event. Accordingly, when the selected sixteenth event occurs, the controller 380 may perform control such that the vibration elements 612, 621, 632, 641, 652, and 661 set among the plurality of vibration elements 611, 612, 621, 622, 631, 632, 641, 642, 651, 652, 661, and 662 perform the vibrating operation of rotating in a counterclockwise direction with respect to a direction perpendicular to the length direction of the main body 301 and the band 302. The selected sixteenth event may be one or more of a call signal reception, a message reception, a phone call reception, a key signal input, a touch input, a schedule notification, an application notification, a time notification, and a state notification of the watch type terminal 300, as described above, and may be a message or a phone call from a specific user or a specific terminal.

On the other hand, the controller 380 may set the selected event as the selected vibration pattern, based on a user input of selecting one or more preset vibration patterns. For example, the controller 380 may acquire a user input of selecting one of a plurality of events and display preset first to fifth patterns on the display unit 351. When the controller 380 acquires, form a user, a touch input of selecting one of the first to fifth patterns, the controller 380 may set the selected pattern as a vibration alarm operation for the selected event.

Also, when the plurality of vibration elements 600 perform the vibrating operations, the controller 380 may control the band adjustment portion 309 to tighten the band 302 in a direction toward the main body 301. Accordingly, the watch type terminal 300 may allow the user to clearly sense the vibration alarm.

Also, when the vibration alarm operation is performed, the controller 380 may output one or more of an audio signal and a vide signal through one or more of a speaker (not illustrated) and an LED (not illustrated) provided in the watch type terminal 300.

During the vibration alarm operation, the controller 380 may perform control such that the region corresponding to the vibration element performing the vibrating operation among the plurality of regions displayed on the display unit 351 is displayed distinguishably from the other regions.

The setting of the alarm operation corresponding to the event has been described by way of example, but embodiments of the present disclosure are not limited thereto. Therefore, various vibration alarm operations may be set according to a user or designer selection, and the number of vibration elements may be variously changed according to a user or designer selection.

Again, FIG. 17 is described.

The controller 380 of the watch type terminal 300 stores the alarm operation corresponding to the acquired user input in association with the selected event (S103).

The controller 380 may store the event based on the user input acquired in operation S101 and the vibration alarm operation corresponding to the event in the memory 360 included in the watch type terminal 300.

When event information is acquired (S105), the controller 380 of the watch type terminal 300 performs an alarm operation corresponding to the acquired event information (S107).

The controller 380 may acquire event information on one or more events among a plurality of events. For example, the controller 380 may acquire event information on one or more of a call signal reception, a message reception, a phone call reception, a key signal input, a touch input, a schedule notification, an application notification, a time notification, and a state notification of the watch type terminal 300.

The controller 380 may perform an alarm operation corresponding to one or more events, based on the acquired event information. For example, the controller 380 may perform a vibration alarm operation corresponding to the acquired event through the plurality of vibration elements 600. The vibration alarm operation corresponding to the acquired event may be a vibration alarm operation based on a user input or a preset vibration alarm operation, as described above in operation 5101.

Also, the controller 380 may adjust a vibration strength, a vibration time, and a repeating number of the vibration alarm operation according to importance of the event based on the acquired event information. For example, when the importance of the event based on the acquired event information is high, the controller 380 may perform control such that the plurality of vibration elements 600 perform the vibration alarm operations with a vibration strength equal to or greater than a reference value. Also, when the importance of the event based on the acquired event information is low, the controller 380 may perform control such that the plurality of vibration elements 600 perform the vibration alarm operations with a vibration strength less than the reference value. As another example, when the importance of the event based on the acquired event information is high, the controller 380 may perform control such that the plurality of vibration elements 600 perform the vibration alarm operations for a vibration time equal to or greater than a reference time. Also, when the importance of the event based on the acquired event information is low, the controller 380 may perform control such that the plurality of vibration elements 600 perform the vibration alarm operations for a vibration time less than the reference time. As further another example, when the importance of the event based on the acquired event information is high, the controller 380 may perform control such that the plurality of vibration elements 600 perform the vibration alarm operations with a repeating number of times equal to or greater than a reference count. Also, when the importance of the event based on the acquired event information is low, the controller 380 may perform control such that the plurality of vibration elements 600 perform the vibration alarm operations with a repeating number of times less than the reference count.

On the other hand, the controller 380 may perform a vibration alarm operation indicating a character, based on acquired event information.

For example, the controller 380 may indicate a character, which represents an event based on acquired event information, with a vibrating operation pattern through a plurality of vibration elements 600.

This will be described below with reference to FIGS. 36 to 40.

FIGS. 36 to 40 are exemplary views illustrating vibrating operation patterns for indicating characters in accordance with an embodiment of the present disclosure.

Figure 36:
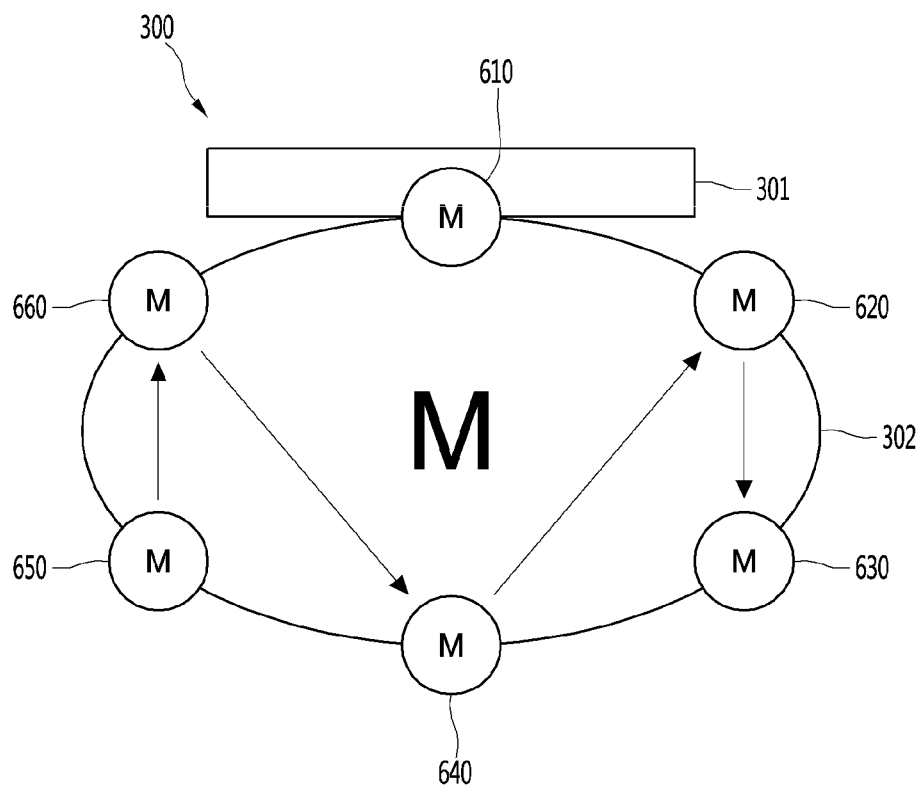
FIGS. 36 to 40 are exemplary views illustrating vibrating operation patterns indicating characters in accordance with an embodiment of the present disclosure.

Referring to FIG. 36, the controller 380 may indicate a character M, which represents an event of message reception based on acquired event information, through the plurality of vibration elements 610, 620, 630, 640, 650, and 660. Specifically, the controller 380 may perform control such that the fifth vibration element 650, the sixth vibration element 660, the fourth vibration element 640, the second vibration element 620, and the third vibration element 630 perform the vibrating operations in this order to thereby indicate the character M with a vibrating operation pattern.

Figure 37:
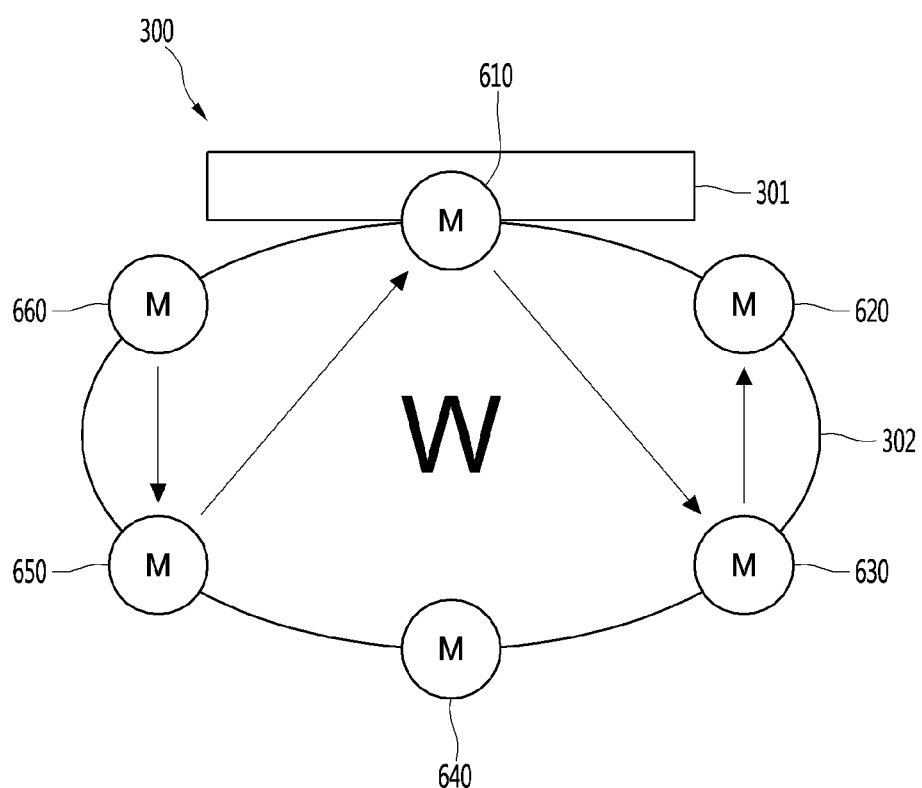

Referring to FIG. 37, the controller 380 may indicate a character W, which represents an event of warning based on acquired event information, through the plurality of vibration elements 610, 620, 630, 640, 650, and 660. Specifically, the controller 380 may perform control such that the sixth vibration element 660, the fifth vibration element 650, the first vibration element 610, the third vibration element 630, and the second vibration element 620 perform the vibrating operations in this order to thereby indicate the character W with a vibrating operation pattern.

Figure 38:
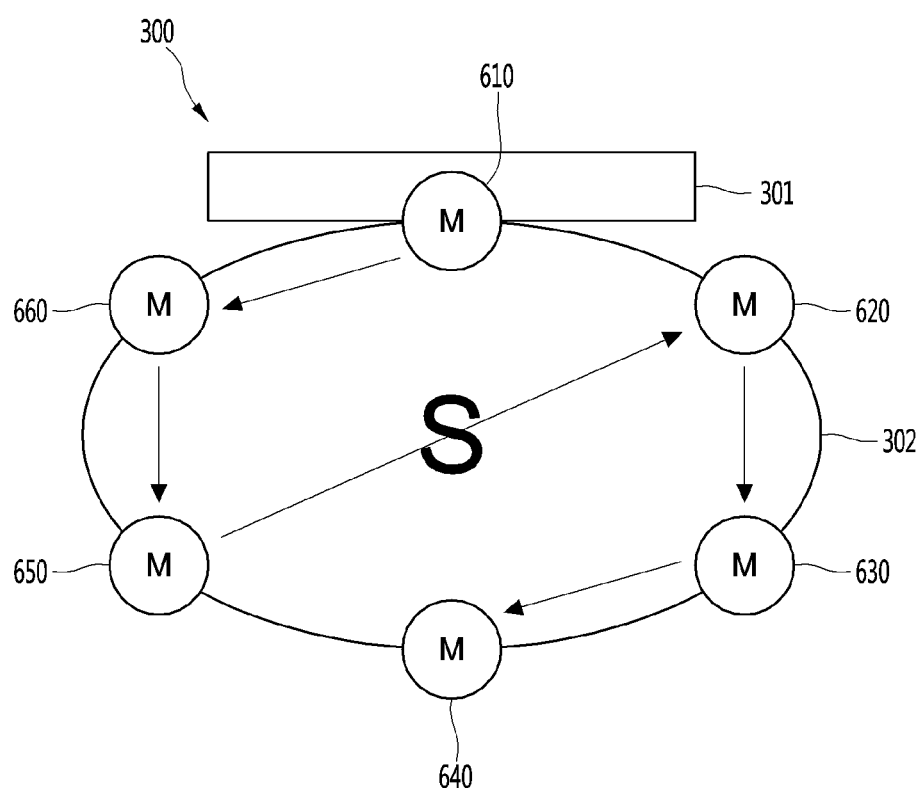

Referring to FIG. 38, the controller 380 may indicate a character S, which represents an event of SNS update based on acquired event information, through the plurality of vibration elements 610, 620, 630, 640, 650, and 660. Specifically, the controller 380 may perform control such that the first vibration element 610, the sixth vibration element 660, the fifth vibration element 650, the second vibration element 620, the third vibration element 630, and the fourth vibration element 640 perform the vibrating operations in this order to thereby indicate the character S with a vibrating operation pattern.

Figure 39:
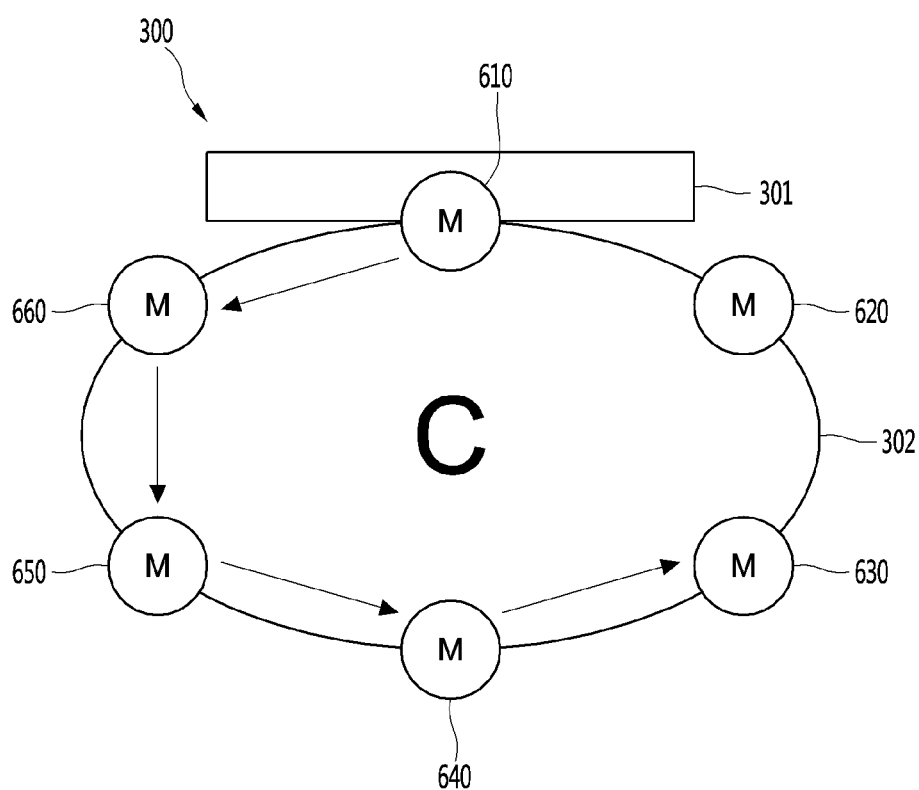

Referring to FIG. 39, the controller 380 may indicate a character C, which represents an event of phone call reception based on acquired event information, through the plurality of vibration elements 610, 620, 630, 640, 650, and 660. Specifically, the controller 380 may perform control such that the first vibration element 610, the sixth vibration element 660, the fifth vibration element 650, the fourth vibration element 640, and the third vibration element 630 perform the vibrating operations in this order to thereby indicate the character C with a vibrating operation pattern.

Figure 40:
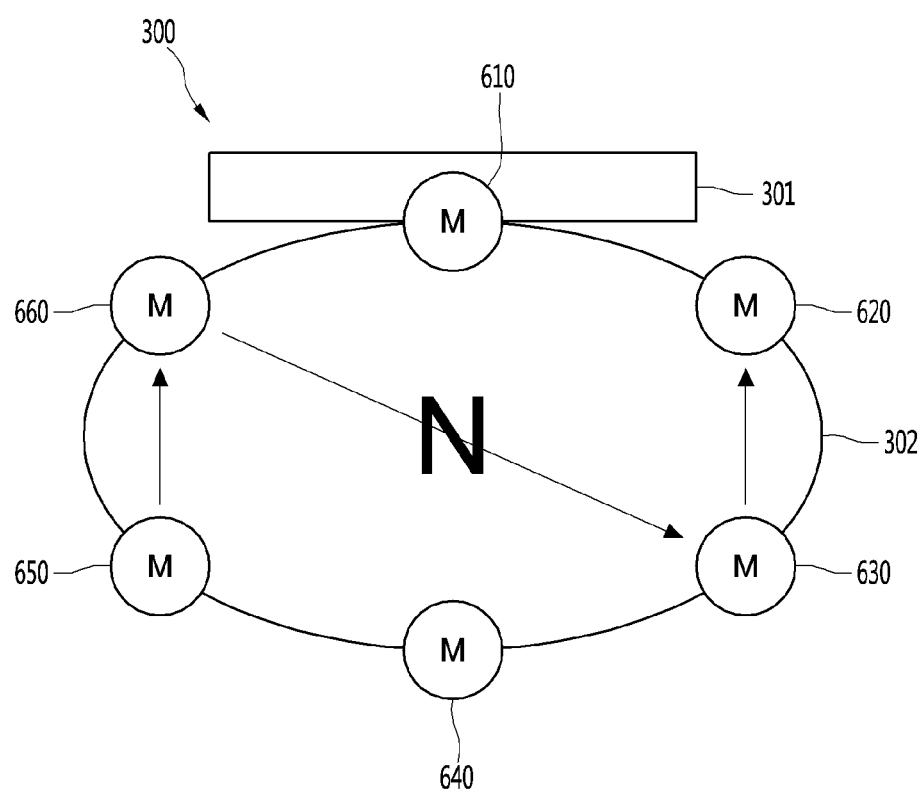

Referring to FIG. 40, the controller 380 may indicate a character N, which represents an event of occurrence of a notification message based on acquired event information, through the plurality of vibration elements 610, 620, 630, 640, 650, and 660. Specifically, the controller 380 may perform control such that the fifth vibration element 650, the sixth vibration element 660, the third vibration element 630, and the second vibration element 620 perform the vibrating operations in this order to thereby indicate the character N with a vibrating operation pattern.

On the other hand, when time-related event information is acquired, the controller 380 may indicate a vibrating operation pattern, which represents time corresponding to the acquired event information, through the plurality of vibration elements 600.

This will be described below with reference to FIGS. 41 to 43.

Figure 41:
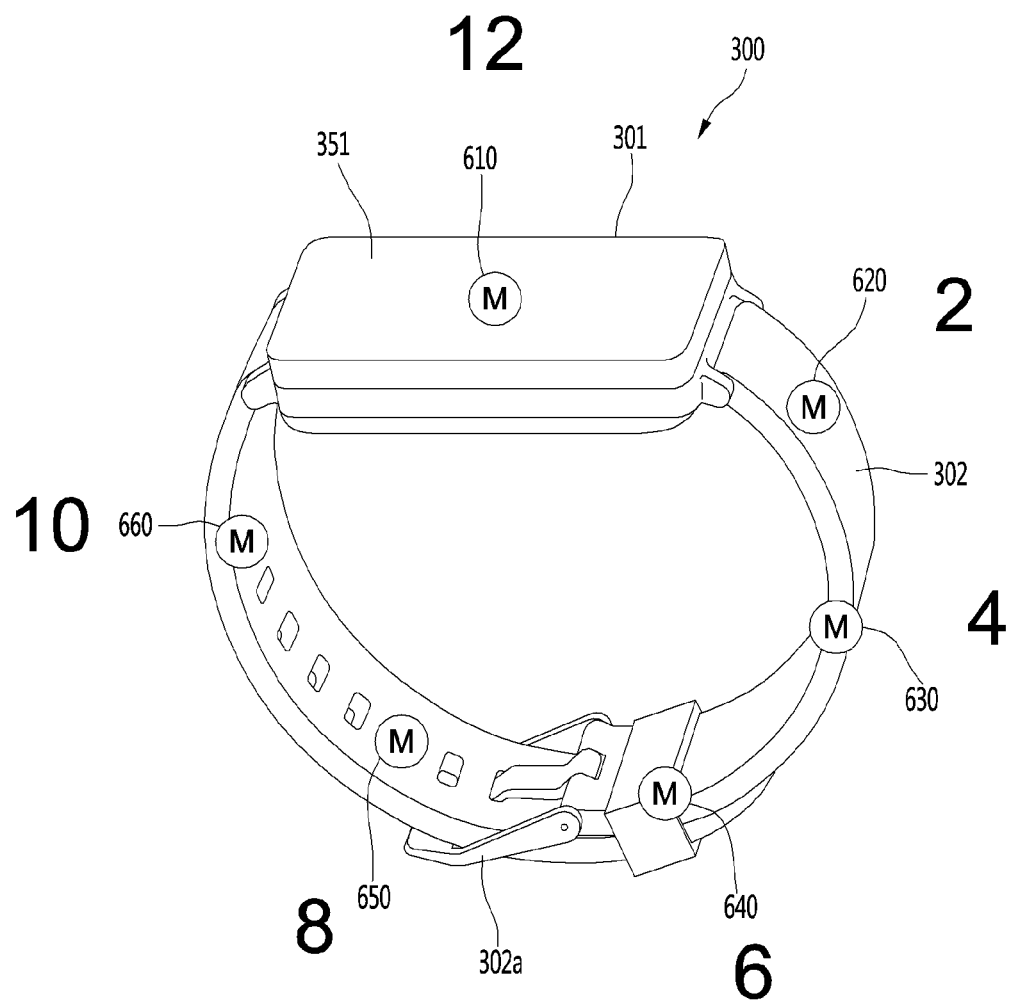
FIG. 41 is an exemplary view illustrating a time corresponding to a plurality of vibration elements in accordance with an embodiment of the present disclosure.

FIG. 41 is an exemplary view illustrating a time corresponding to a plurality of vibration elements in accordance with an embodiment of the present disclosure.

Figure 42:
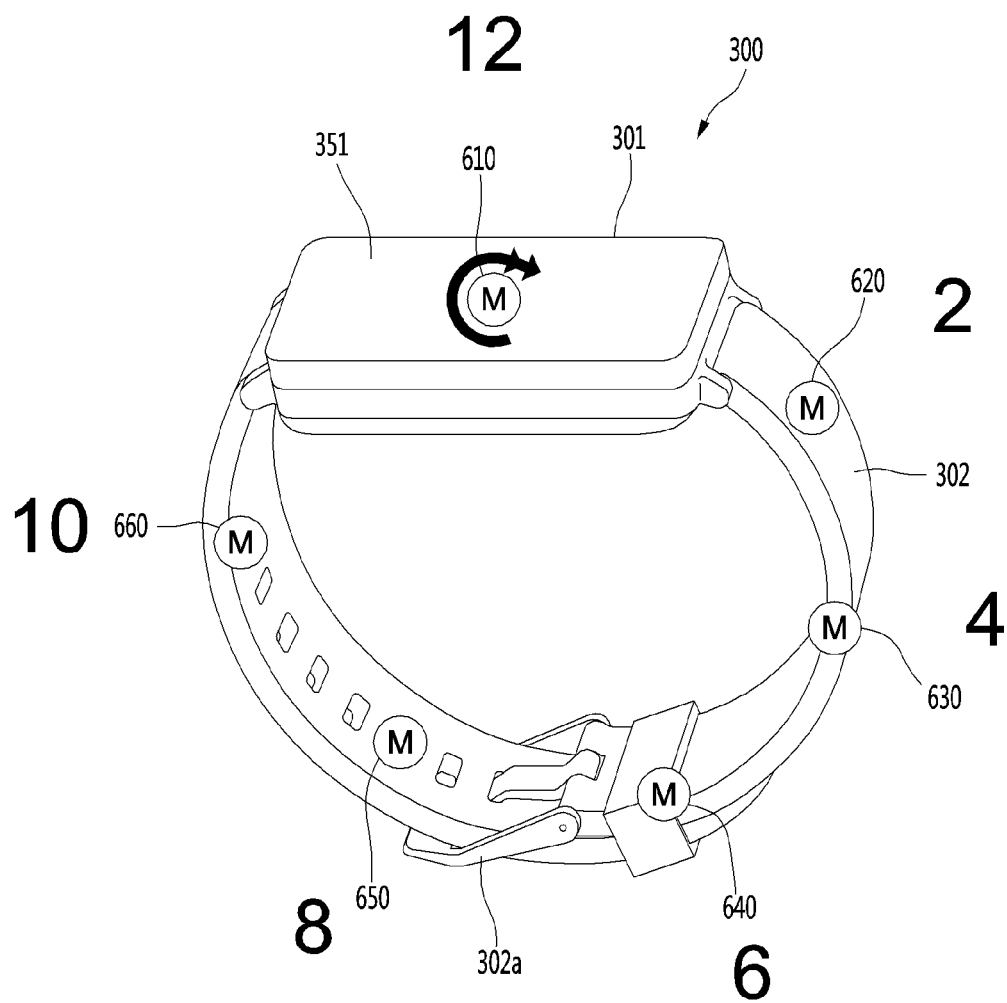
FIGS. 42 and 43 are exemplary views illustrating vibrating operation patterns indicating a time in accordance with an embodiment of the present disclosure.
Figure 43:
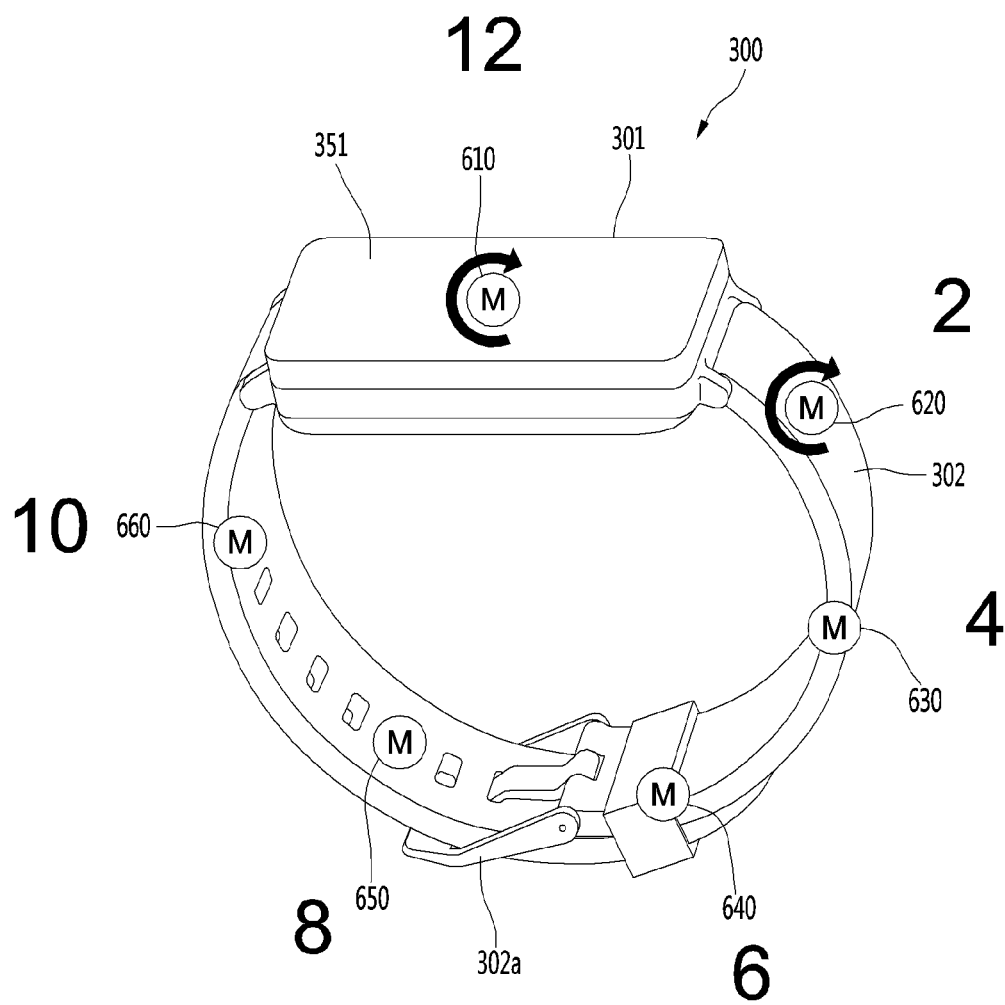

FIGS. 42 and 43 are exemplary views illustrating vibrating operation patterns indicating a time in accordance with an embodiment of the present disclosure.

Referring to FIG. 41, among the plurality of vibration elements 610, 620, 630, 640, 650, and 660, the first vibration element 610 may correspond to a marking indicating 12 o'clock, the second vibration element 620 may correspond to a marking indicating 2 o'clock, the third vibration element 630 may correspond to a marking indicating 4 o'clock, the fourth vibration element 640 may correspond to a marking indicating 6 o'clock, the fifth vibration element 650 may correspond to a marking indicating 8 o'clock, and the sixth vibration element 660 may correspond to a marking indicating 10 o'clock.

According to an embodiment, referring to FIG. 42, when the event based on the acquired event information corresponds to 12 o'clock, the controller 380 may perform control such that the first vibration element 610 among the plurality of vibration elements 610, 620, 630, 640, 650, and 660 performs a vibrating operation with a second strength. As such, when there is a vibration element corresponding to the time based on the acquired event information, the controller 380 may indicate the time based on the event information with a vibrating operation pattern through the corresponding vibration element.

According to another embodiment, referring to FIG. 43, when the event based on the acquired event information corresponds to 1 o'clock, the controller 380 may perform control such that the first vibration element 610 and the second vibration element 620 among the plurality of vibration elements 610, 620, 630, 640, 650, and 660 performs vibrating operations with a first strength. As such, even when there is no vibration element corresponding to the time based on the acquired event information, the controller 380 may indicate the time based on the event information with a vibrating operation pattern through the plurality of vibration elements.

Also, since the controller 380 can recognize whether the wearing position of the watch type terminal 300 is a left wrist of the user or a right wrist of the user, the controller 380 may perform control such that the vibration elements 600 operate with a vibration pattern indicating the time based on the recognized position. Accordingly, even when the wearing position of the watch type terminal 300 is changed, the controller 380 may indicate the time, based on the acquired event information corresponding to the changed position, with a vibrating operation pattern through the plurality of vibration elements 600.

As such, the controller 380 may indicate the time based on the acquired event information with a vibrating operation pattern through the plurality of vibration elements 600. The vibrating operation pattern indicating the time has been described by way of example, but embodiments of the present disclosure are not limited thereto. Therefore, the vibrating operation pattern may be variously set according to a user or designer selection.

On the other hand, when direction-related event information is acquired, the controller 380 may indicate a vibrating operation pattern, which represents a direction corresponding to the acquired event information, through the plurality of vibration elements 600.

This will be described below with reference to FIGS. 44 and 45.

Figure 44:
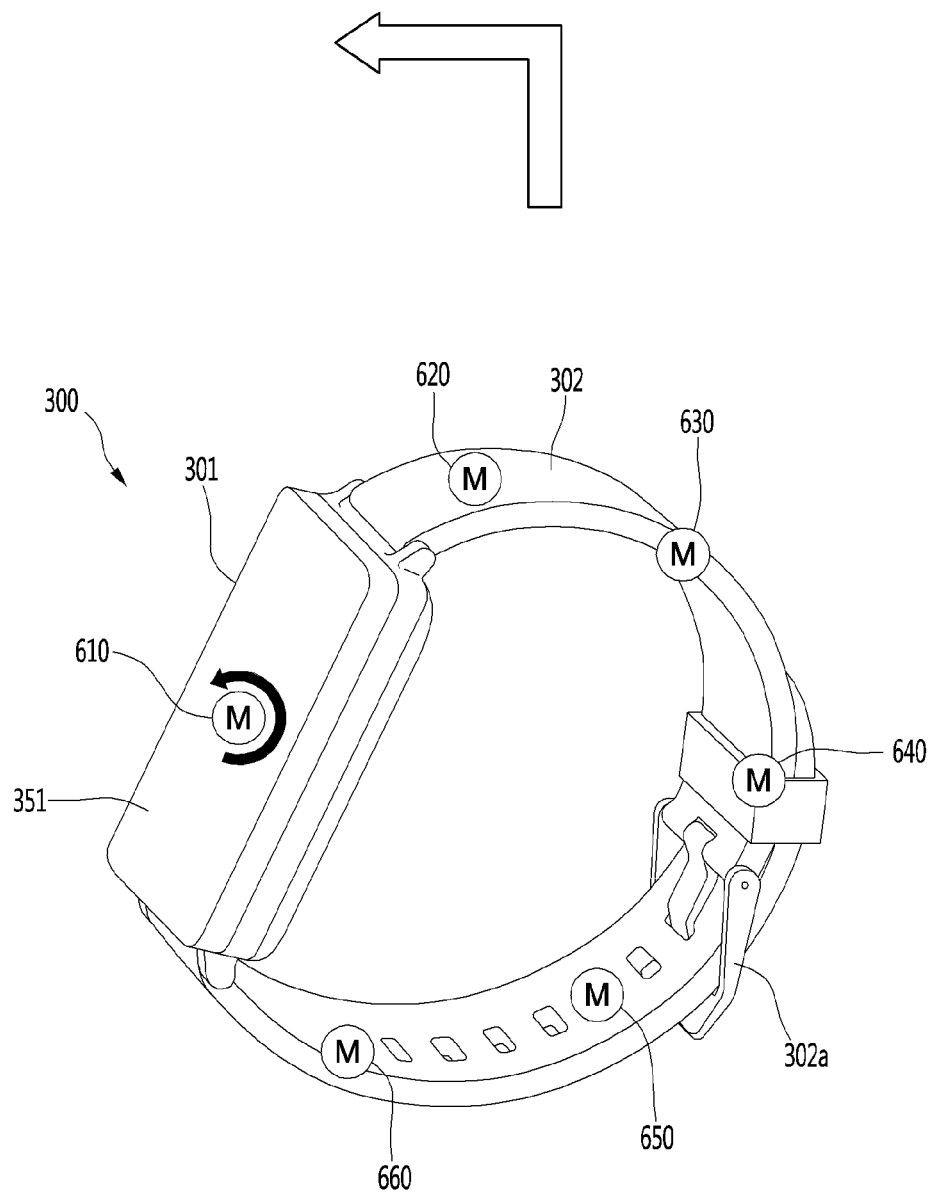
FIG. 44 is an exemplary view illustrating a vibrating operation pattern indicating a left direction in accordance with an embodiment of the present disclosure.

FIG. 44 is an exemplary view illustrating a vibrating operation pattern indicating a left direction with reference to an embodiment of the present disclosure.

Figure 45:
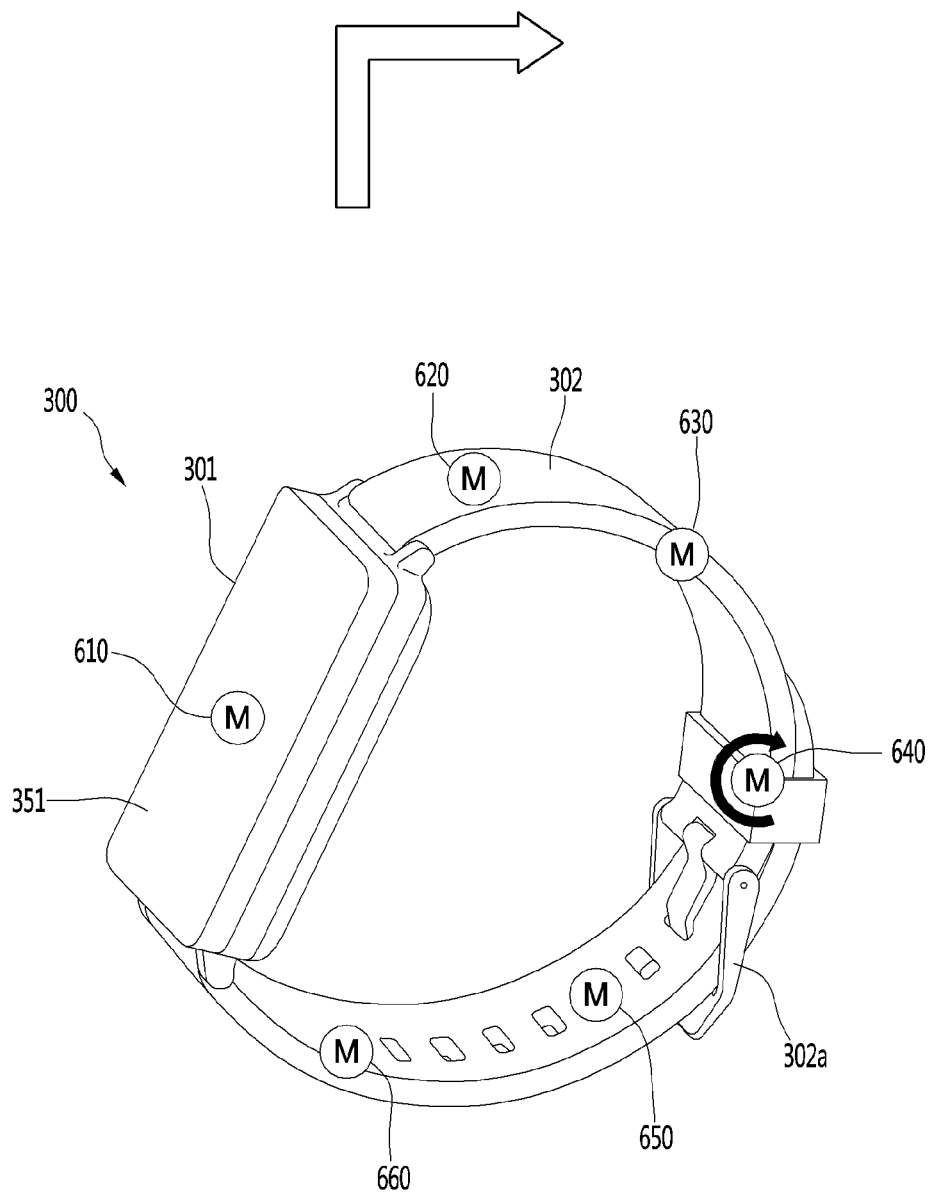
FIG. 45 is an exemplary view illustrating a vibrating operation pattern indicating a right direction in accordance with an embodiment of the present disclosure.

FIG. 45 is an exemplary view illustrating a vibrating operation pattern indicating a right direction with reference to an embodiment of the present disclosure.

Referring to FIG. 44, when the event based on the acquired event information corresponds to a left direction, the controller 380 may perform control such that the first vibration element 610 among the plurality of vibration elements 610, 620, 630, 640, 650, and 660 performs a vibrating operation in a rotating direction corresponding to the left direction.

Referring to FIG. 45, when the event based on the acquired event information corresponds to a right direction, the controller 380 may perform control such that the fourth vibration element 640 among the plurality of vibration elements 610, 620, 630, 640, 650, and 660 performs a vibrating operation in a rotating direction corresponding to the right direction.

Also, since the controller 380 can recognize whether the wearing position of the watch type terminal 300 is a left wrist of the user or a right wrist of the user, the controller 380 may perform control such that the vibration elements 600 operate with a vibration pattern indicating a direction based on the recognized position. Accordingly, even when the wearing position of the watch type terminal 300 is changed, the controller 380 may indicate the direction, based on the acquired event information corresponding to the changed position, with a vibrating operation pattern through the plurality of vibration elements 600.

As such, the controller 380 may indicate the direction based on the acquired event information with a vibrating operation pattern through the plurality of vibration elements 600. The vibrating operation pattern indicating the direction has been described by way of example, but embodiments of the present disclosure are not limited thereto. Therefore, the vibrating operation pattern may be variously set according to a user or designer selection.

Again, FIG. 17 is described.

When the controller 380 of the watch type terminal 300 acquires a user input for stopping an alarm operation (S109), the controller 380 performs control to stop the running alarm operation (S111).

When the controller 380 acquires a user input for stopping a vibration alarm operation during the vibration alarm operation based on event information acquired through the plurality of vibration elements 600, the controller 380 may perform control such that the plurality of vibration elements 600 stop the vibration alarm operations thereof.

For example, the controller 380 may acquire a user input through one or more of the user input unit 323 and the touch sensor provided in the display unit 351 during the vibration alarm operation, as the user input for stopping the vibration alarm operation.

As another example, the controller 380 may acquire a movement of the watch type terminal 300 through the sensing unit 340, as the user input for stopping the vibration alarm operation, when the degree of movement of the watch type terminal 300 is a certain value or more. The sensing unit 340 corresponds to the sensing unit 140 of the terminal 100 and may include one or more sensors configured to sense at least one of information of the watch type terminal 300, information on an ambient environment surrounding the watch type terminal 300, and user information.

This will be described below with reference to FIG. 46.

Figure 46:
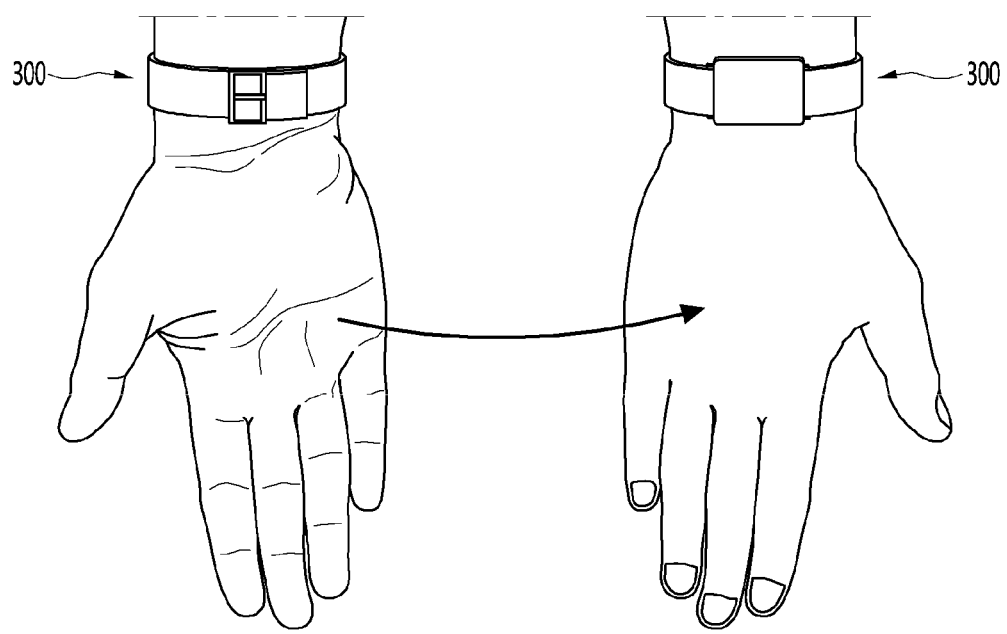
FIG. 46 is an exemplary view illustrating a user motion for stopping a vibration alarm operation in accordance with an embodiment of the present disclosure.

FIG. 46 is an exemplary view illustrating a user motion for stopping a vibration alarm operation in accordance with an embodiment of the present disclosure.

Referring to FIG. 46, the controller 380 may acquire a user motion of shaking the watch type terminal 300 through the sensing unit 340, as the user input for stopping the vibration alarm operation, when the degree of shaking is a certain value or more. Accordingly, the controller 380 may perform control such that the plurality of vibration elements 600 stop the running vibration alarm operations based on the acquired event information.

The stopping of the vibration alarm operations has been described by way of example, but embodiments of the present disclosure are not limited thereto. Therefore, the stopping of the vibration alarm operations may be variously set according to a user or designer selection. Also, the acquiring of the user input for stopping the vibration alarm operations may be performed only when the vibration alarm operations of the vibration elements 600 are running.

Again, FIG. 17 is described.

When a user input for the watch type terminal 330 is acquired (S113), the controller 380 of the watch type terminal 300 performs a feedback operation corresponding to the acquired user input (S115).

The controller 380 may acquire the user input for the watch type terminal 300 through one or more of the user input unit 323 and the touch sensor provided in the display unit 351. Accordingly, the controller 380 may perform the feedback operation corresponding to the acquired user input through the plurality of vibration elements 600.

According to an embodiment, the controller 380 may acquire a user input for the plurality of regions 510, 520, 530, 540, 550, and 560 displayed on the display unit 351, as an unlock pattern for unlocking a lock screen. For example, in a case where the unlock pattern is a pattern that touches the first region 510, the fourth region 540, and the fifth region 550 in this order, when the controller 380 receives the user input for inputting the unlock pattern, the controller 380 may perform control such that the first vibration element 610, the fourth vibration element 640, and the fifth vibration element 650 perform a feedback operation to vibrate in this order. Even when the plurality of regions 510, 520, 530, 540, 550, and 560 are displayed or not displayed on the display unit 351, if the controller 380 acquires a user input for one or more regions among the plurality of regions 510, 520, 530, 540, 550, and 560, the controller 380 may perform control such that the vibration element corresponding to the acquired one or more regions performs a feedback operation to vibrate.

Another embodiment will be described below with reference to FIG. 47.

Figure 47:
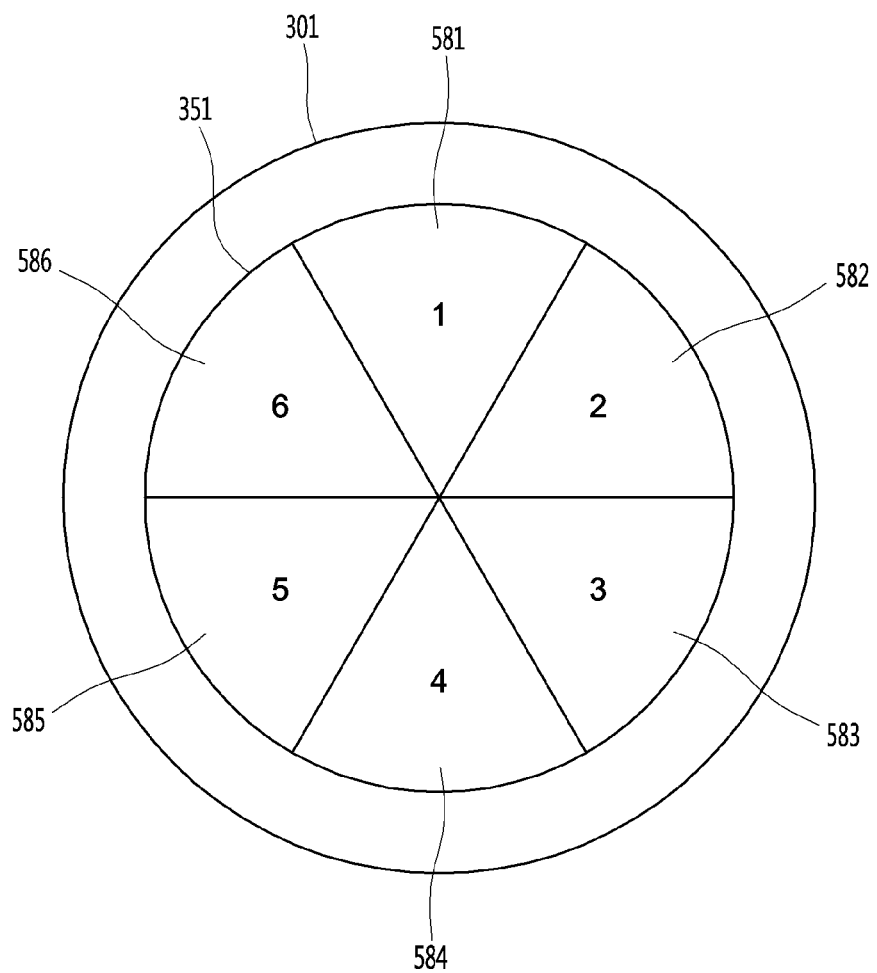
FIG. 47 is an exemplary view illustrating number input regions in accordance with an embodiment of the present disclosure.

FIG. 47 is an exemplary view illustrating a number input region in accordance with an embodiment of the present disclosure.

Referring to FIG. 47, the controller 380 may acquire a user input for a plurality of number regions 581, 582, 583, 584, 585, and 586 displayed on the display unit 351, as a user input for inputting numbers 1 to 6. For example, when the controller 380 acquires a user input for a first number region 581, the controller 380 may recognize that number 1 was input. The controller 380 may perform control such that the first vibration element 610 corresponding to the first number region 581 performs a feedback operation to vibrate. As another example, when the controller 380 acquires a user input for a fifth number region 585, the controller 380 may recognize that number 5 was input. The controller 380 may perform control such that the fifth vibration element 650 corresponding to the fifth number region 585 performs a feedback operation to vibrate. In this manner, even when the plurality of number regions 581, 582, 583, 584, 585, and 586 are displayed or not displayed on the display unit 351, if the controller 380 acquires a user input for one or more number regions among the plurality of number regions 581, 582, 583, 584, 585, and 586, the controller 380 may perform control such that the vibration element corresponding to the acquired one or more number regions performs a feedback operation to vibrate.

Further another embodiment will be described below with reference to FIG. 48.

Figure 48:
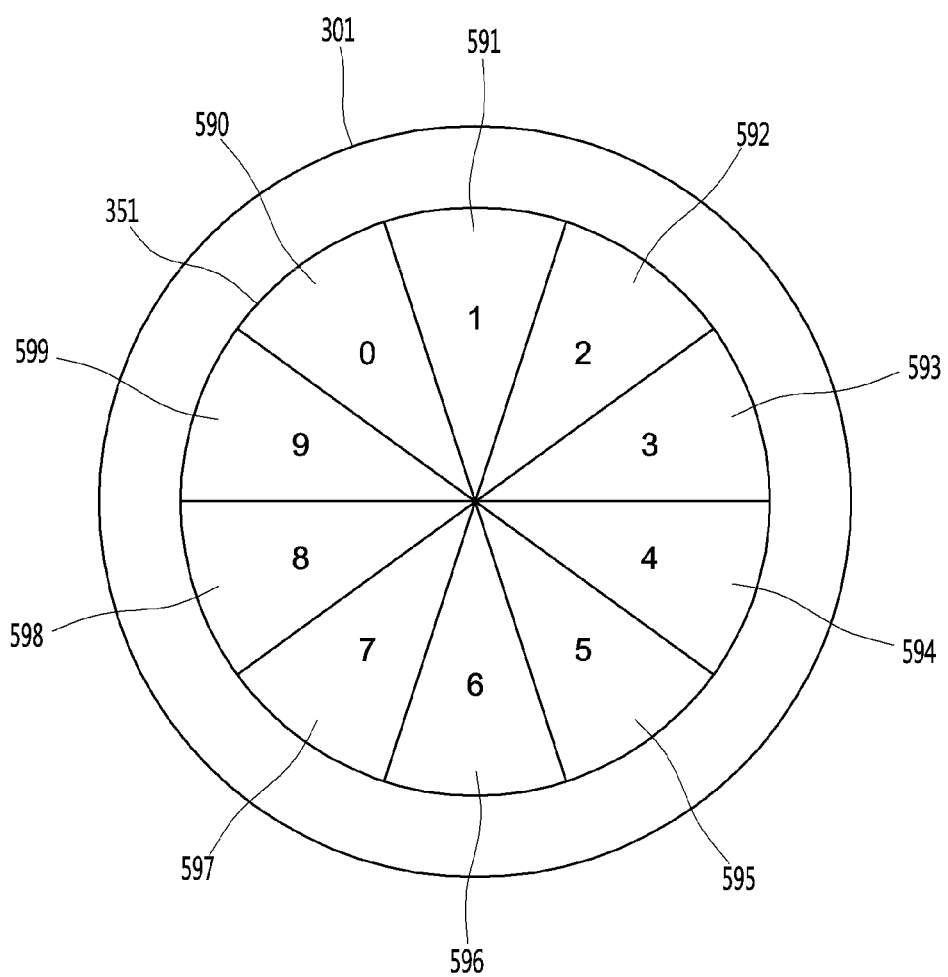
FIG. 48 is an exemplary view illustrating number input regions in accordance with another embodiment of the present disclosure.

FIG. 48 is an exemplary view illustrating a number input region in accordance with further another embodiment of the present disclosure.

Referring to FIG. 48, the controller 380 may acquire a user input for a plurality of number regions 590, 591, 592, 593, 594, 595, 596, 597, 598, and 599 displayed on the display unit 351, as a user input for inputting numbers 0 to 9. For example, when the controller 380 acquires a user input for a zeroth number region 590, the controller 380 may recognize that number 0 was input. The controller 380 may perform control such that the first vibration element 600 corresponding to the zeroth number region 590 performs a feedback operation to vibrate. As another example, when the controller 380 acquires a user input for a sixth number region 596, the controller 380 may recognize that number 6 was input. The controller 380 may perform control such that the first vibration element 600 corresponding to the sixth number region 596 performs a feedback operation to vibrate. In this manner, even when the plurality of number regions 590, 591, 592, 593, 594, 595, 596, 597, 598, and 599 are displayed or not displayed on the display unit 351, if the controller 380 acquires a user input for one or more number regions among the plurality of number regions 590, 591, 592, 593, 594, 595, 596, 597, 598, and 599, the controller 380 may perform control such that the vibration element corresponding to the acquired one or more number regions performs a feedback operation to vibrate. The plurality of vibration elements 600 respectively corresponding to the plurality of number regions 590, 591, 592, 593, 594, 595, 596, 597, 598, and 599 may be provided with ten vibration elements 600.

Further another embodiment will be described below with reference to FIG. 49.

Figure 49:
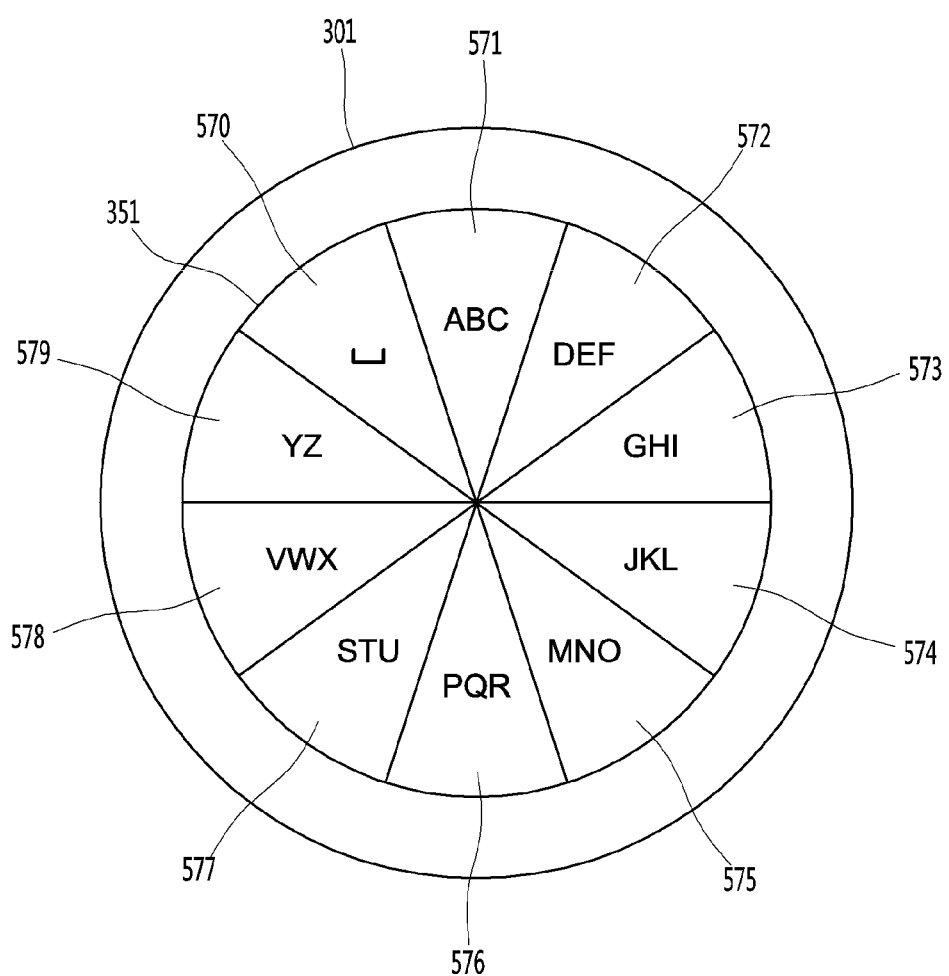
FIG. 49 is an exemplary view illustrating character input regions in accordance with an embodiment of the present disclosure.

FIG. 49 is an exemplary view illustrating a character input region in accordance with an embodiment of the present disclosure.

Referring to FIG. 49, the controller 380 may acquire a user input for a plurality of character regions 570, 571, 572, 573, 574, 575, 576, 577, 578, and 579 displayed on the display unit 351, as a user input for inputting alphabets A to Z and a space key. For example, when the controller 380 acquires a user input for the first character region 571 once, the controller 380 may recognize that character A was input. The controller 380 may perform control such that the first vibration element 600 corresponding to the first character region 571 performs a feedback operation to vibrate. Also, when the controller 380 acquires a user input for the first character region 571 twice, the controller 380 may recognize that character B was input. The controller 380 may perform control such that the first vibration element 600 corresponding to the first character region 571 performs a feedback operation to vibrate. Also, when the controller 380 acquires a user input for the first character region 571 three times, the controller 380 may recognize that character C was input. The controller 380 may perform control such that the first vibration element 600 corresponding to the first character region 571 performs a feedback operation to vibrate.

As another example, when the controller 380 acquires a user input for the seventh character region 577 once, the controller 380 may recognize that character S was input. The controller 380 may perform control such that the first vibration element 600 corresponding to the seventh character region 577 performs a feedback operation to vibrate. Also, when the controller 380 acquires a user input for the seventh character region 577 twice, the controller 380 may recognize that character T was input. The controller 380 may perform control such that the first vibration element 600 corresponding to the seventh character region 577 performs a feedback operation to vibrate. Also, when the controller 380 acquires a user input for the seventh character region 577 three times, the controller 380 may recognize that character U was input. The controller 380 may perform control such that the first vibration element 600 corresponding to the seventh character region 577 performs a feedback operation to vibrate.

In this manner, even when the plurality of character regions 570, 571, 572, 573, 574, 575, 576, 577, 578, and 579 are displayed or not displayed on the display unit 351, if the controller 380 acquires a user input for one or more number regions among the plurality of character regions 570, 571, 572, 573, 574, 575, 576, 577, 578, and 579, the controller 380 may perform control such that the vibration element corresponding to the acquired one or more character regions performs a feedback operation to vibrate. The plurality of vibration elements 600 respectively corresponding to the plurality of character regions 570, 571, 572, 573, 574, 575, 576, 577, 578, and 579 may be provided with ten vibration elements 600.

In this manner, the watch type terminal 300 may provide the user with the feedback based on the user input through the plurality of vibration elements 600. Since the user can receive the feedback based on the user input for the watch type terminal 300, the user can input a desired input without viewing the watch type terminal 300. Also, since the user can input a desired input even when the character or the number is not displayed on the display unit 351 of the watch type terminal 300, it is possible to safely input one or more of characters and numbers which require security.

As described above, the watch type terminal 300 may provide the user with vibration alarms respectively corresponding to the plurality of events. In accordance with the present disclosure, since the watch type terminal can be worn on a user's body at a constant position and in a constant direction, the user can sense the same vibration alarm with respect to the same event. Therefore, the user can easily recognize the acquired event information through the vibration alarm provided by the watch type terminal 300. Also, in accordance with the present disclosure, since the intuitive interface for setting the vibration alarm pattern can be provided, the user can easily set a desired vibration alarm pattern.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. An operation method of a watch type terminal including a plurality of vibration elements, the operation method comprising:
    acquiring a user input for setting a vibration alarm pattern;
    acquiring event information; and
    operating one or more vibration elements among the plurality of vibration elements in the vibration alarm pattern corresponding to the acquired event information,
    wherein the acquiring the user input for setting the vibration alarm pattern comprises:
        displaying a plurality of regions respectively corresponding to the plurality of vibration elements;

acquiring the user input for one or more regions among the plurality of regions; and acquiring the vibration alarm pattern based on the acquired user input for the one or more regions.

2. The operation method of claim 1, wherein the vibration alarm pattern corresponding to the acquired event information comprises vibration alarm patterns respectively corresponding to a plurality of events, and the vibration alarm pattern comprises one or more of a vibrating operation or non-operation, a vibrating operation strength, a vibrating operation time, a vibrating operation speed, and number of times of vibrating operations of each of the plurality of vibration elements.

3. The operation method of claim 1, wherein the event information comprises one or more of a call signal reception, a message reception, a phone call reception, a key signal input, a touch input, a schedule notification, an application notification, a time notification, and a state notification of the watch type terminal.

4. The operation method of claim 1, wherein the operating in the vibration alarm pattern corresponding to the acquired event information comprises operating the one or more vibration elements among the plurality of vibration elements based on one or more of a vibrating operation strength, a vibrating operation speed, and number of vibrating operations corresponding to importance of the acquired event information.

5. The operation method of claim 1, wherein the acquiring the vibration alarm pattern comprises:

acquiring the user input for setting the vibration alarm pattern corresponding to one or more events among a plurality of events; and storing the acquired vibration alarm pattern in association with the one or more events.

6. The operation method of claim 5, wherein the acquiring the user input for setting the vibration alarm pattern corresponding to the one or more events comprises:

acquiring the user input of selecting the one or more events among the plurality of events.

7. The operation method of claim 6, wherein the operating in the vibration alarm pattern corresponding to the acquired event information comprises operating the vibration element corresponding to the acquired user input for the one or more regions.

8. The operation method of claim 1, wherein the acquiring the user input for setting the vibration alarm pattern further comprises:

operating one or more vibration elements corresponding to the one or more regions for which the user input is acquired.

9. The operation method of claim 1, further comprising:

setting a plurality of regions respectively corresponding to the plurality of vibration elements;

acquiring a user input for one or more regions among the plurality of set regions; and operating one or more vibration elements corresponding to the one or more regions for which the user input is acquired.

10. The operation method of claim 1, wherein the operating in the vibration alarm pattern corresponding to the acquired event information comprises operating one or more vibration elements corresponding to a direction or a time among the plurality of vibration elements, wherein the direction or the time corresponds to the acquired event information.

11. A watch type terminal comprising:

a display unit with a touch sensor;

a haptic module comprising a plurality of vibration elements and configured to generate a tactile effect that is sensible by a user of the watch type terminal; and a controller configured to acquire a user input for setting a vibration alarm pattern, acquire event information on the watch type terminal and control one or more vibration elements among the plurality of vibration elements to operate in the vibration alarm pattern corresponding to the acquired event information, wherein the controller displays a plurality of regions respectively corresponding to the plurality of vibration elements, acquires the user input for one or more regions among the plurality of regions, and acquires the vibration alarm pattern based on the acquired user input for the one or more regions.

12. The watch type terminal of claim 11, wherein the vibration alarm pattern corresponding to the acquired event information comprises vibration alarm patterns respectively corresponding to a plurality of events, and the vibration alarm pattern comprises one or more of a vibrating operation or non-operation, a vibrating operation strength, a vibrating operation time, a vibrating operation speed, and number of times of vibrating operations of each of the plurality of vibration elements.

13. The watch type terminal of claim 11, wherein the event information comprises one or more of a call signal reception, a message reception, a phone call reception, a key signal input, a touch input, a schedule notification, an application notification, a time notification, and a state notification of the watch type terminal.

14. The watch type terminal of claim 11, wherein the controller performs control such that one or more vibration elements among the plurality of vibration elements operate based on one or more of a vibrating operation strength, a vibrating operation speed, and number of vibrating operations corresponding to importance of the acquired event information.

15. The watch type terminal of claim 11, further comprising:

a memory;

wherein the controller acquires the user input for setting the vibration alarm pattern corresponding to one or more events among a plurality of events through the touch sensor and stores the acquired vibration alarm pattern in the memory.

16. The watch type terminal of claim 15, wherein the controller acquires the user input for selecting the at least one of the plurality of events through the touch sensor.

17. The watch type terminal of claim 16, wherein the controller performs control such that the vibration element corresponding to the user input for the one or more regions among the plurality of regions operates based on the acquired user input for the one or more regions among the plurality of regions.

18. The watch type terminal of claim 11, further comprising a display unit with a touch sensor, wherein the controller displays a plurality of regions respectively corresponding to the plurality of vibration elements on the display unit, acquires a user input for one or more regions among the plurality of displayed regions through the touch sensor, and operates one or more vibration elements corresponding to the one or more regions for which the user input is acquired.

19. The watch type terminal of claim 11, further comprising a display unit with a touch sensor,
> wherein the controller sets a plurality of regions respectively corresponding to the plurality of vibration elements on the display unit, acquires a user input for one or more regions among the plurality of set regions through the touch sensor, and operates one or more vibration elements corresponding to the one or more regions for which the user input is acquired.

20. The watch type terminal of claim 11, wherein the controller performs control such that one or more vibration elements corresponding to a direction or a time among the plurality of vibration elements operate, wherein the direction or the time corresponds to the acquired event information.

* * * * *